(12) United States Patent
Heo et al.

(10) Patent No.: US 12,537,605 B2
(45) Date of Patent: Jan. 27, 2026

(54) APPARATUS AND METHOD FOR OPTICAL COMMUNICATION USING ORGANIC PHOTOELECTRIC CONVERSION DEVICE

(71) Applicants: Samsung Electronics Co., Ltd., Suwon-si (KR); INCHEON NATIONAL UNIVERSITY RESEARCH & BUSINESS FOUNDATION, Incheon (KR)

(72) Inventors: Chul Joon Heo, Busan (KR); Hyunchae Chun, Incheon (KR); Seoyeon Oh, Incheon (KR); Seonghyeon Cho, Incheon (KR); Kyung Bae Park, Hwaseong-si (KR); Hwijoung Seo, Suwon-si (KR); Younhee Lim, Suwon-si (KR)

(73) Assignees: Samsung Electronics Co., Ltd., Gyeonggi-do (KR); Incheon National University Research & Business Foundation, Incheon (KR)

( * ) Notice: Subject to any disclaimer, the term of this patent is extended or adjusted under 35 U.S.C. 154(b) by 211 days.

(21) Appl. No.: 18/148,124

(22) Filed: Dec. 29, 2022

(65) Prior Publication Data

US 2023/0208531 A1 Jun. 29, 2023

(30) Foreign Application Priority Data

Dec. 29, 2021 (KR) .......... 10-2021-0191523
Apr. 29, 2022 (KR) .......... 10-2022-0053830

(51) Int. Cl.
H04B 10/50 (2013.01)
H04B 10/69 (2013.01)

(52) U.S. Cl.
CPC ......... H04B 10/6971 (2013.01); H04B 10/50 (2013.01)

(58) Field of Classification Search
CPC .. H04B 10/6971; H04B 10/50; H04B 10/501; H04B 2210/254; H04B 10/116; Y02E 10/549
(Continued)

(56) References Cited

U.S. PATENT DOCUMENTS 5,847,817 A * 12/1998 Zediker ................. G01S 7/4911
356/28.5
9,912,500 B2 3/2018 Yu et al.
(Continued)

FOREIGN PATENT DOCUMENTS

BR 102012005220 A2 * 10/2016 .......... H03M 13/251
CN 109412725 A * 3/2019 .......... H04B 17/391
(Continued)

OTHER PUBLICATIONS

Musumeci et al., A Tutorial on Machine Learning for Failure Management in Optical Networks, 2019 (Year: 2019).*
(Continued)

*Primary Examiner* — Jai M Lee
(74) *Attorney, Agent, or Firm* — Harness, Dickey & Pierce, P.L.C.

(57) ABSTRACT

A receiver of an optical communication system includes an organic photoelectric conversion device configured to convert optical signals received from a transmitter into an electrical signal; and a demodulator configured to input the electrical signal to a trained artificial neural network and demodulate the electrical signal based on an output of the trained artificial neural network.

20 Claims, 23 Drawing Sheets

(58) Field of Classification Search
USPC .......................................................... 398/193
See application file for complete search history.

(56) References Cited

U.S. PATENT DOCUMENTS

| | | | |
|---|---|---|---|
| 11,677,467 B2* | 6/2023 | Lee ..................... | H04B 10/116 |
| | | | 398/116 |
| 2011/0310951 A1* | 12/2011 | Cvijetic ............... | H04B 10/614 |
| | | | 375/233 |
| 2019/0014628 A1* | 1/2019 | Wang ..................... | H04B 10/60 |
| 2019/0207700 A1* | 7/2019 | Soto ..................... | H04J 14/0305 |
| 2020/0153504 A1 | 5/2020 | Tanimura et al. | |
| 2022/0049158 A1 | 2/2022 | Mangold et al. | |

FOREIGN PATENT DOCUMENTS

| | | |
|---|---|---|
| CN | 112291005 A | 1/2021 |
| CN | 112865866 A | 5/2021 |
| KR | 2021-0057037 A | 5/2021 |

OTHER PUBLICATIONS

Haigh, Paul (2014) Using Equalizers to Increase Data Rates in Organic Photonic Devices for Visible Light Communications Systems. Doctoral thesis, University of Northumbria.

* cited by examiner

APPARATUS AND METHOD FOR OPTICAL COMMUNICATION USING ORGANIC PHOTOELECTRIC CONVERSION DEVICE

CROSS-REFERENCE TO RELATED APPLICATIONS

This application claims priority to and the benefit of Korean Patent Application No. 10-2021-0191523 filed in the Korean Intellectual Property Office on Dec. 29, 2021 and Korean Patent Application No. 10-2022-0053830 filed in the Korean Intellectual Property Office on Apr. 29, 2022, the entire contents of each of which are incorporated herein by reference.

BACKGROUND

1. Field

The present inventive concepts relate to optical communication systems using an organic photoelectric conversion device.

2. Related Art

A photoelectric conversion device converts light into electrical signals and includes a photodiode and an optical transistor. The photoelectric conversion device can be applied to (e.g., included in) an image sensor, a solar cell, an organic light-emitting device, and the like.

An image sensor including the photodiode is getting higher resolution day by day, and accordingly, the pixel size is getting smaller. In the case of silicon photodiodes, which are currently mainly used, the sensitivity may deteriorate because the absorption area of the light decreases as the size of the pixel decreases. Accordingly, organic materials that can replace the silicon are being researched.

Since the organic materials have a large absorption coefficient and can selectively absorb the light in a specific wavelength region depending on the molecular structure, it can replace the photodiode and the color filter simultaneously, which is very advantageous for sensitivity improvement and high integration.

SUMMARY

Some example embodiments provide a receiver of an optical communication system.

Some example embodiments provide an organic photoelectric conversion device.

Some example embodiments provide a method for transmitting an optical signal.

According to some example embodiments, a receiver of an optical communication system may include: an organic photoelectric conversion device configured to convert optical signals received from a transmitter into an electrical signal; and a demodulator configured to input the electrical signal to a trained artificial neural network and demodulate the electrical signal based on an output of the trained artificial neural network, wherein the optical signals are pre-equalized by the transmitter.

In some example embodiments, the receiver may further include: a signal to interference and noise ratio (SINR) estimator configured to estimate an SINR of the electrical signal based on the output of the trained artificial neural network and feedback the estimated SINR to the transmitter.

In some example embodiments, the SINR estimator may further configured to determine a magnitude of a reverse bias to be supplied to the organic photoelectric conversion device based on the estimated SINR.

In some example embodiments, the organic photoelectric conversion device may further be configured to receive a re-equalized optical signal according to an equalization parameter adjusted based on the SINR from the transmitter.

In some example embodiments, the organic photoelectric conversion device may further be configured to convert an optical signal having a particular wavelength band into the electrical signal.

In some example embodiments, the organic photoelectric conversion device may include a plurality of cells, and each cell of the plurality of cells includes a plurality of active layers each corresponding to a plurality of wavelength bands.

In some example embodiments, the plurality of active layers in each cell of the plurality of cells may have a two-dimensional array in the cell.

In some example embodiments, the plurality of active layers in each cell of the plurality of cells may have a three-dimensional stacking structure within the cell.

In some example embodiments, the plurality of wavelength bands may include at least one of a red light band, a green light band, a blue light band, an infrared band, or a near-ultraviolet band.

In some example embodiments, the plurality of active layers may include a first active layer and a second active layer, the first active layer different from the second active layer, and the organic photoelectric conversion device may be configured to convert the optical signals, based on the optical signals being in a first wavelength band of the plurality of wavelength bands and a second wavelength band of the plurality of wavelength bands, the second wavelength band different from the first wavelength band, such that the first active layer of the plurality of active layers is configured to convert an optical signal of the first wavelength band, and the second active layer of the plurality of active layers is configured to convert an optical signal of the second wavelength band.

According to some example embodiments, an organic photoelectric conversion device may include a plurality of cells configured to convert optical signals of a wireless optical communication system into electrical signals, wherein each of the plurality of cells includes a first electrode and a second electrode facing each other and a plurality of active layers positioned between the first electrode and the second electrode, and the plurality of active layers corresponds to a plurality of wavelength bands, respectively and converts an optical signal of a corresponding wavelength band into an electrical signal.

In some example embodiments, the plurality of active layers in each cell of the plurality of cells may have a two-dimensional array structure in the cell.

In some example embodiments, the plurality of active layers in each cell of the plurality of cells may have a three-dimensional stacking structure in the cell.

In some example embodiments, the plurality of wavelength bands may include at least one of a red light band, a green light band, a blue light band, an infrared band, or a near-ultraviolet band.

In some example embodiments, the plurality of active layers may include a first active layer and a second active layer, the first active layer different from the second active layer, and the organic photoelectric conversion device is configured to convert the optical signals, based on the optical signals being in a first wavelength band of the plurality of wavelength bands and a second wavelength band of the plurality of wavelength bands, the second wavelength band different from the first wavelength band, such that the first active layer of the plurality of active layers converts an optical signal of the first wavelength band, and the second active layer of the plurality of active layers converts an optical signal of the second wavelength band.

According to some example embodiments, at least two cells of the plurality of cells may include separate pluralities of active layers, where the separate pluralities of active layers may be configured to photoelectrically convert optical signals of different combinations of wavelength bands.

According to some example embodiments, a method for transmitting an optical signal may include: equalizing signals at a transmitter based on a particular equalization parameter; modulating the equalized signals at the transmitter and driving the modulated equalized signals at the transmitter to a light source to be transmitted as an optical signal; receiving, at the transmitter, a signal to interference and noise ratio (SINR) estimated by a receiver subsequently to the optical signal being transmitted from the light source and being received and demodulated by the receiver; and adjusting, at the transmitter, the particular equalization parameter based on the received SINR.

In some example embodiments, the method may further include re-equalizing, at the transmitter, a signal corresponding to a next bit to be transmitted to the receiver according to the adjusted equalization parameter.

In some example embodiments, the method may further include adjusting, at the transmitter, a modulation level for encoding based on the received SINR and encoding the next bit into a signal based on the adjusted modulation level.

In some example embodiments, the method may further include adjusting, at the transmitter, a modulation depth for modulation based on the received SINR; modulating the re-equalized signal based on the adjusted modulation depth; and driving the modulated signal to the light source.

DETAILED DESCRIPTION

Figure 1:
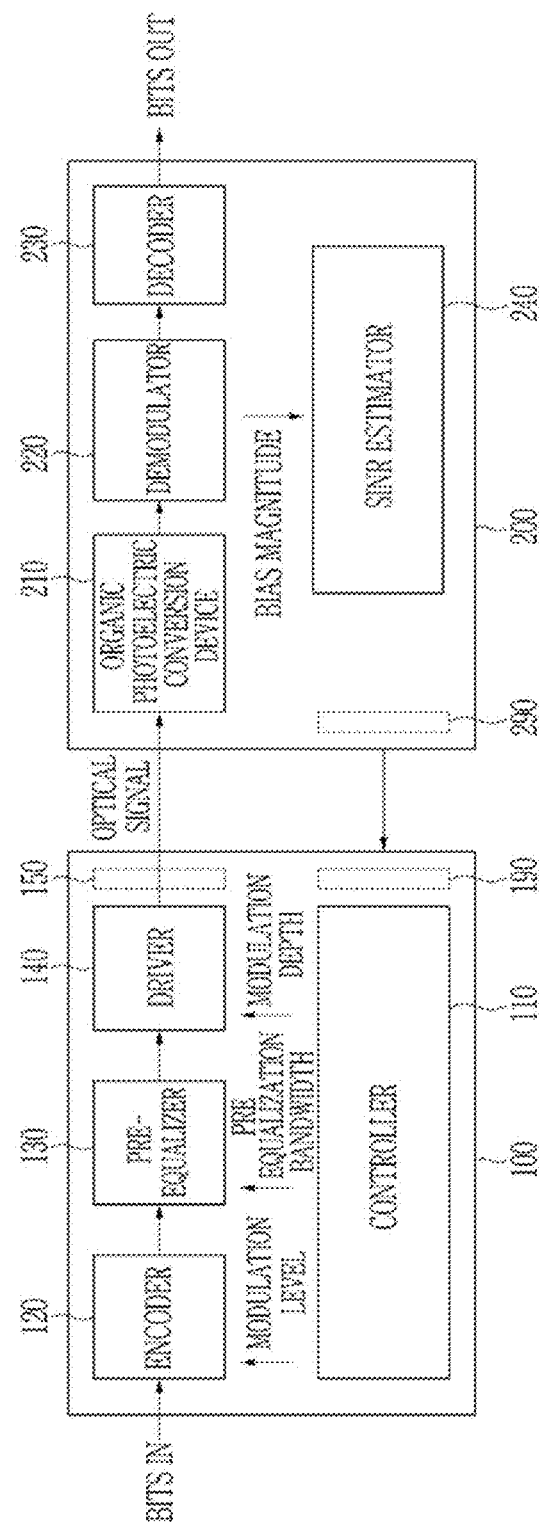
FIG. 1 is a diagram illustrating an optical signal transmission/reception system according to some example embodiments.

In the following detailed description, some example embodiments of the present inventive concepts have been shown and described in detail with reference to the accompanying drawing, simply by way of illustration. However, the present inventive concepts may be implemented in various different forms and is not limited to some example embodiments described herein. Further, in order to clearly describe the description in the drawing, parts not related to the description are omitted, and similar reference numerals are attached to similar parts throughout the specification.

Throughout the specification, a transmitter or a receiver may be called a terminal, user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the transmitter or the receiver may be called a base station (BS), an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be used to distinguish one element from another element. For example, a first element may be named a second element without departing from the right range of the present inventive concepts, and similarly, a second element may be named a first element.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

In the flowchart described with reference to the drawings in this specification, the order of the operations may be changed, several operations may be merged, certain operations may be divided, and specific operations may not be performed.

Figure 2:
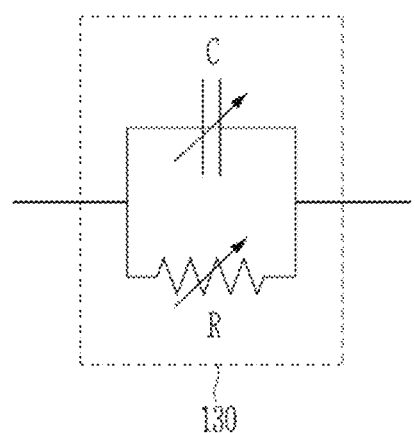
FIG. 2 is a circuit diagram illustrating a pre-equalizer of a transmitter according to some example embodiments.
Figure 3:
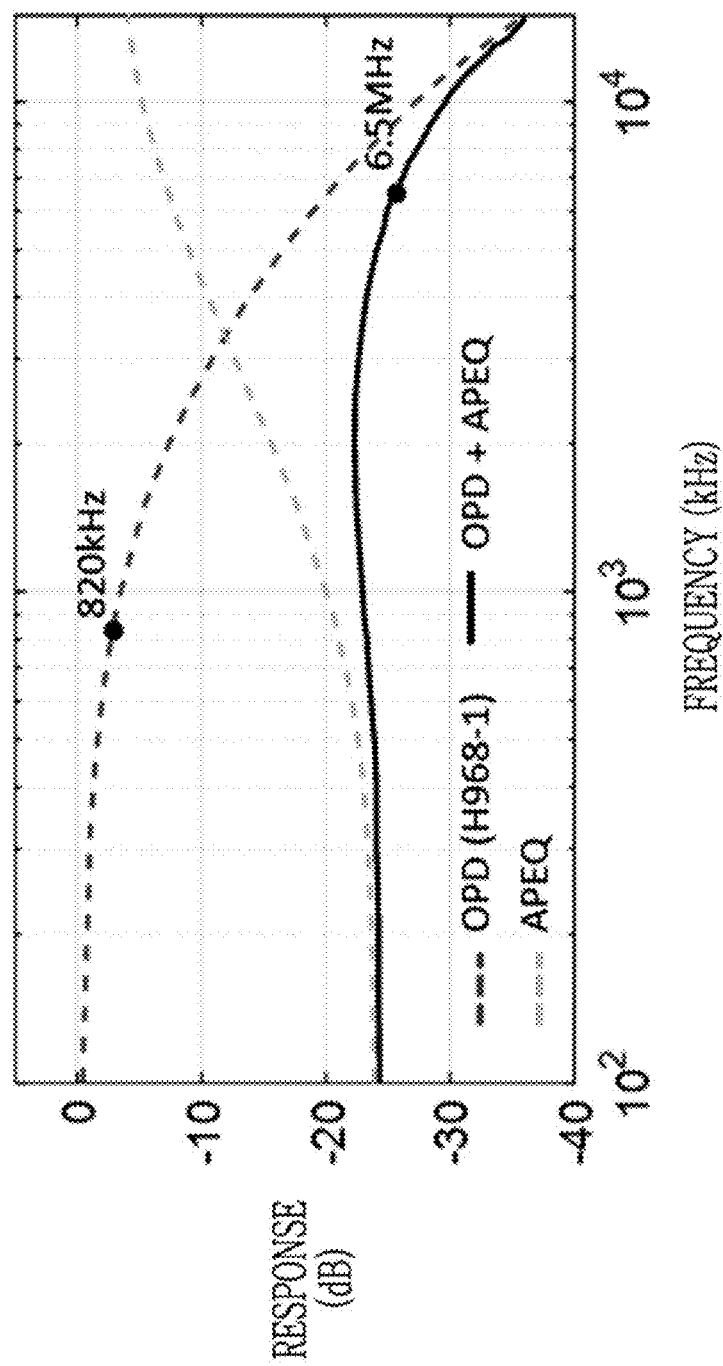
FIG. 3 is a graph illustrating the improved frequency response of an organic photoelectric conversion device according to some example embodiments.

FIG. 1 is a diagram illustrating an optical signal transmission/reception system according to some example embodiments, FIG. 2 is a circuit diagram illustrating a pre-equalizer of a transmitter according to some example embodiments, and FIG. 3 is a graph illustrating the improved frequency response of an organic photoelectric conversion device according to some example embodiments.

Referring to FIG. 1, a transmission/reception system according to some example embodiments may include a transmitter 100 and a receiver 200. The transmitter 100 may include a controller 110, an encoder 120, a pre-equalizer 130, and a driver 140. The receiver 200 may include an organic photoelectric conversion device 210, a machine learning (ML) demodulator 220, a decoder 230, and a signal to interference and noise ratio (SINR) estimator 240.

The controller 110 of the transmitter 100 may determine a transmission parameter for encoding, equalization, and optical signal driving and may transmit the determined transmission parameter to the encoder 120, the pre-equalizer 130, and the driver 140. The transmission parameter determined by the controller 110 may include a modulation level for encoding, an equalization parameter for pre-equalization, and a modulation depth for driving an optical signal. For example, when feedback of the estimated SINR of the received signal is received from the receiver 200, the controller 110 may adjust the modulation level, the equalization parameter, and the modulation depth based on the received SINR feedback and transfer the adjusted modulation level, the equalization parameter, and the modulation depth to the encoder 120, the pre-equalizer 130, and the driver 140. For example, the transmitter 100 may be communicatively coupled (e.g., via a communication interface 190 which may be a wired or wireless communication interface device) to the receiver 200 (which may include a communication interface 290 which may be a wired or wireless communication interface device. The receiver 200 may transmit feedback (e.g., feedback of the estimated SINR of the received signal that is received at the receiver 200) from the receiver 200 to the transmitter 100 via the respective, communicatively coupled communication interfaces 190 and 290 of the transmitter 100 and the receiver 200.

The encoder 120 of the transmitter 100 may generate an encoded signal by encoding a bit string to be transmitted to the receiver 200 according to the modulation level determined by the controller 110.

The pre-equalizer 130 of the transmitter 100 may compensate for the reception characteristic of the organic photoelectric conversion device 210 (e.g., organic photoelectric transformation element such as organic photodiode (OPD)) by reinforcing a partial frequency band of the encoded signal. The pre-equalizer 130 may reinforce a band corresponding to the reinforcement bandwidth (i.e., pre-equalization parameter) determined by the controller 110 in the encoded signal. The pre-equalizer 130 may pre-equalize the optical signal based on a particular (or, alternatively, predetermined) equalization bandwidth (i.e., the equalization parameter) and then re-equalize the optical signal according to the equalization bandwidth adjusted based on the SINR feedback from the receiver 200 (i.e., re-pre-equalized).

In general, an equalizer is used to improve the quality of the received signal by compensating for the strength and phase characteristics of the received signal at the receiving end of the digital communication system. In this description, the pre-equalizer 130 may be located in the transmitter 100 in order to supplement the reception characteristics of the organic photoelectric conversion device 210 in advance.

The transmitter 100 according to some example embodiments may improve the bandwidth of the receiver 200, and thus improve the operation performance of the receiver 200 and the optical signal transmission/reception system that includes same, by pre-equalizing the optical signal, which may cause improved frequency response of the organic photoelectric conversion device 210 in the receiver 200.

Referring to FIG. 2, the pre-equalizer 130 according to some example embodiments may be an analog pre-equalizer (APEQ) or a digital pre-equalizer (DPEQ).

The APEQ may include at least one capacitor (C) and resistance (R) connected in parallel, for example connected in parallel between the encoder 120 and the driver 140. The capacitor and resistor included in the APEQ may be a variable capacitor and a variable resistor, respectively, and the controller 110 may adjust capacitance of the variable capacitor and impedance of the variable resistor of the pre-equalizer 130 based on the feedback received at the transmitter 100 from the receiver 200. When the APEQ is used as the pre-equalizer 130 and the APEQ is a secondary filter or higher-order filter including a plurality of resistors and capacitors, the equalization performance of the pre-equalizer 130 can be improved. Since the APEQ is an analog circuit, the delay in the circuit is short, so it can be easy to implement a real-time system.

The DPEQ can easily implement higher-order filters in a digital domain. When the DPEQ is used as the pre-equalizer 130, the DPEQ may flexibly reflect the characteristics of the various organic photoelectric conversion devices 210 according to the feedback from the receiver 200.

FIG. 3 shows the frequency characteristic of the OPD improved by the signal equalized in the transmitter 100 by the APEQ pre-equalizer 130 when the OPD is used as the organic photoelectric conversion device 210. Referring to FIG. 3, when a 3 dB frequency of the frequency response of the organic photoelectric conversion device 210 according to some example embodiments is 820 kHz, the 3 dB frequency of the frequency response of the receiver 200 reinforced by the APEQ (1100Ω and 180 pF) is 6.5 MHz, which is about 8 times improved over the 3 dB frequency of the frequency response of the organic photoelectric conversion device 210, thereby indicating a significant improvement in the bandwidth and thus operational performance of the receiver 200 based on the reinforcement due to pre-equalization by the APEQ pre-equalizer 130.

The driver 140 of the transmitter 100 may modulate an electrical signal according to the modulation depth determined by the controller 110 and drive the modulated signal to a light source 150 (LED or laser, etc.). Thereafter, the optical signal driven by the driver 140 may be output (e.g., transmitted, emitted as emitted light, etc.) from the light source 150. The driver 140 may modulate the optical signal by using a pulse modulation scheme such as a pulse amplitude modulation (PAM), a pulse-code modulation (PCM), a pulse-width modulation (PWM), and a pulse-position modulation (PPM), a pulse-density modulation (PDM).

The organic photoelectric conversion device 210 of the receiver 200 may be an optoelectronic device including an organic material and may convert an optical signal received (e.g., received as incident light) from the transmitter 100 into an electrical signal. Such conversion of an optical signal may be referred to herein as photoelectrically converting the optical signal. The organic photoelectric conversion device 210 may convert (e.g., photoelectrically convert) the optical signal having a particular (or, alternatively, predetermined) wavelength band into the electrical signal where the wavelength band of the optical signal may be plural. The organic photoelectric conversion device 210 according to some example embodiments will be described in detail referring to FIG. 8 to FIG. 11.

The ML demodulator 220 of the receiver 200 may demodulate the original signal from the electrical signal converted by the organic photoelectric conversion device 210 to generate a demodulated electrical signal by using an ML model trained through sample data. For example, the ML model (also referred to herein interchangeably as an artificial neural network) of the ML demodulator 220 may use a bi-directional long short-term memory (Bi-LSTM) method and may be trained by using a pulse-modulated signal (e.g., L-level PAM signal), such that the ML model of the ML demodulator 220 may be a trained ML model, or trained artificial neural network. A method for training the artificial neural network by the ML demodulator 220 and a structure and method for demodulating the signal using the trained artificial neural network (e.g., a structure of the trained artificial neural network implemented by the ML demodulator 220) will be described in detail referring to FIG. 6 and FIG. 7.

Herein, the ML model may have any structure that is trainable, e.g., with training data. For example, the ML model may include an artificial neural network, a decision tree, a support vector machine, a Bayesian network, a genetic algorithm, and/or the like. The ML model will now be described by mainly referring to an artificial neural network, but the example embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like. Herein, the ML model (e.g., the trained artificial neural network is used to demodulate data from the electrical signal converted by the organic photoelectric conversion device 210. Therefore, communication performance from the distorted received signal can be improved.

The decoder 230 of the receiver 200 may decode bits from the demodulated electrical signal.

The SINR estimator 240 of the receiver 200 may estimate the SINR of the optical signal from the demodulated electrical signal and feedback the estimated SINR to the transmitter 100. The SINR feedback and adjustment/change of the equalization parameter according to the feedback SINR may be performed when the receiver 200 initially accesses the transmitter 100. When the transmitter 100 transmits the pre-equalized optical signal based on the particular (or, alternatively, predetermined) equalization parameter in the initial access process of the receiver 200, the receiver 200 may estimate the SINR of the equalized optical signal and feedback the estimated SINR to the transmitter 100. The transmitter 100 may adjust/change the equalization parameter of the pre-equalizer 130 based on the feedback SINR, then re-equalize the optical signal transmitted by the driver 140 according to the adjusted equalization parameter, and use the re-equalized optical signal for data transmission. Here, the optical signal pre-equalized based on the particular (or, alternatively, predetermined) equalization parameter may be a reference signal (e.g., a first signal) transmitted by the transmitter 100 for estimating the channel state of the receiver 200. Thereafter, the optical signal re-equalized based on the adjusted equalization parameter may be a second signal that is used to transmit data to the receiver.

The SINR estimator 240 of the receiver 200 may determine the magnitude of reverse bias to be supplied to the organic photoelectric conversion device 210 according to the estimated SINR. When the reverse bias is supplied to the organic photoelectric conversion device 210, the bandwidth may increase, but noise due to the organic photoelectric conversion device 210 may also increase. Therefore, a reverse bias of the appropriate (e.g., a particular) magnitude may be supplied to the organic photoelectric conversion device 210. Since the reverse bias adjusted according to the estimated SINR is supplied to the organic photoelectric conversion device 210 of the receiver 200, the organic photoelectric conversion device 210 may be improved or optimized for an actual communication environment. For example, when the estimated SINR is determined (e.g., at the SINR estimator 240) to be lower than a particular (or, alternatively, predetermined) reference value, the SINR estimator 240 may reduce the magnitude of the reverse bias in order to reduce the noise generated by the organic photoelectric conversion device 210. In some example embodiments, when the estimated SINR is greater than the particular (or, alternatively, predetermined) reference value, the SINR estimator 240 may increase the magnitude of the reverse bias in order to increase the bandwidth of the organic photoelectric conversion device 210. This is because, when the SINR is high (i.e., when the signal strength is relatively larger and/or greater than a particular threshold SINR value stored at the receiver 200), the bandwidth of the organic photoelectric conversion device 210 can be increased even if the noise by the organic photoelectric conversion device 210 is further added. In some example embodiments, when the SINR is determined (e.g., at the SINR estimator 240) to be low (e.g., smaller than the particular threshold SINR value stored at the receiver 200), the performance of the receiver 200 can be further improved by reducing the noise rather than increasing the bandwidth.

Figure 4:
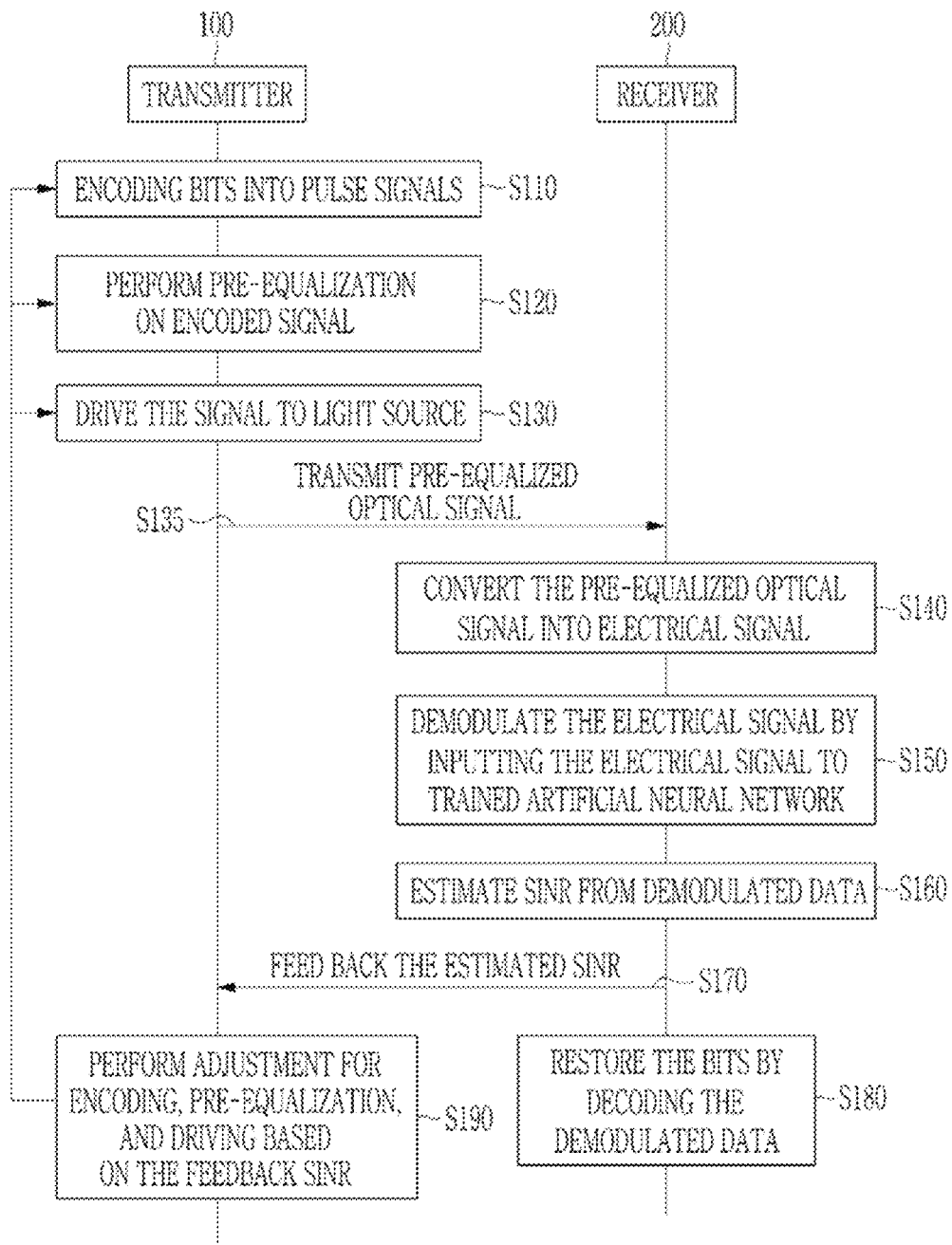
FIG. 4 is a flowchart illustrating a method for transmitting and receiving an optical signal according to some example embodiments.
Figure 5:
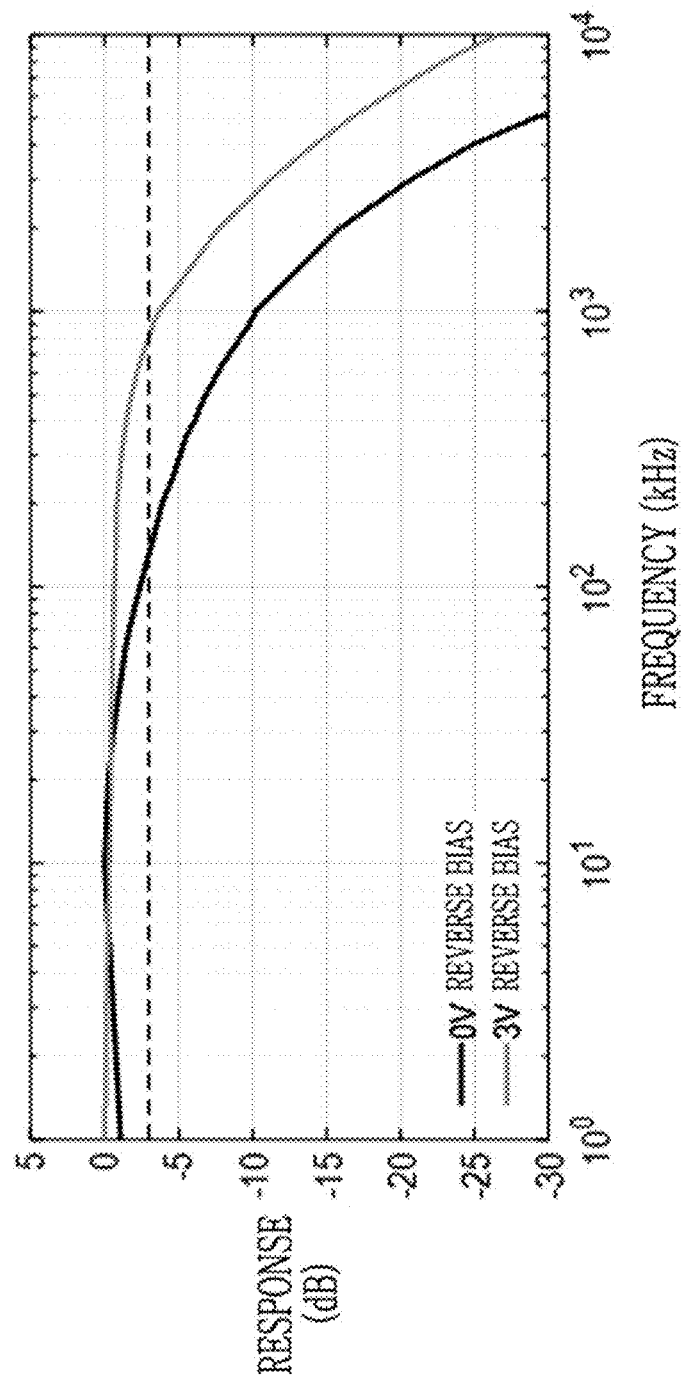
FIG. 5 is a graph illustrating the frequency response of an OPD supplied with different reverse bias according to some example embodiments.
Figure 6:
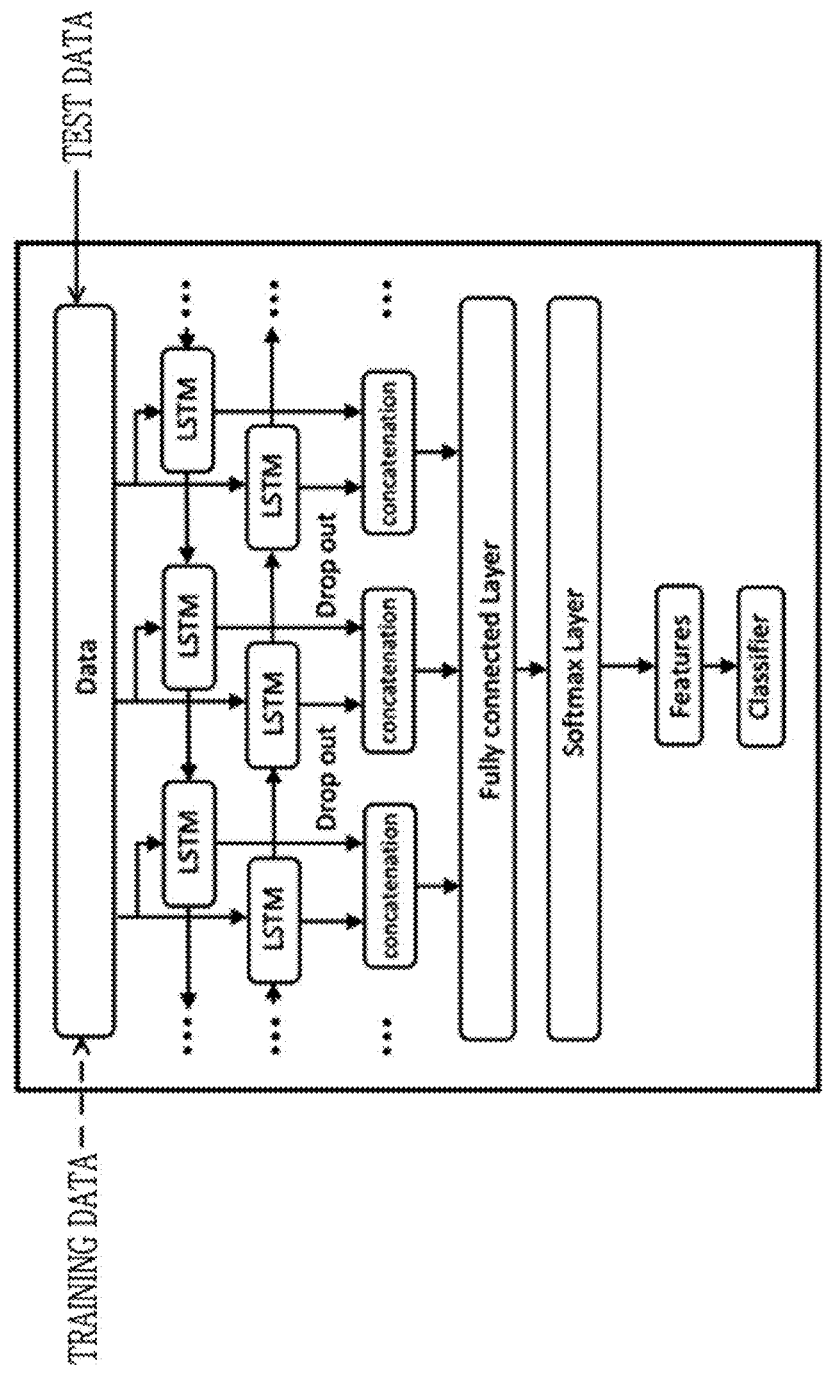
FIG. 6 is a schematic diagram illustrating a machine learning structure of an ML demodulator of the receiver according to some example embodiments.
Figure 7:
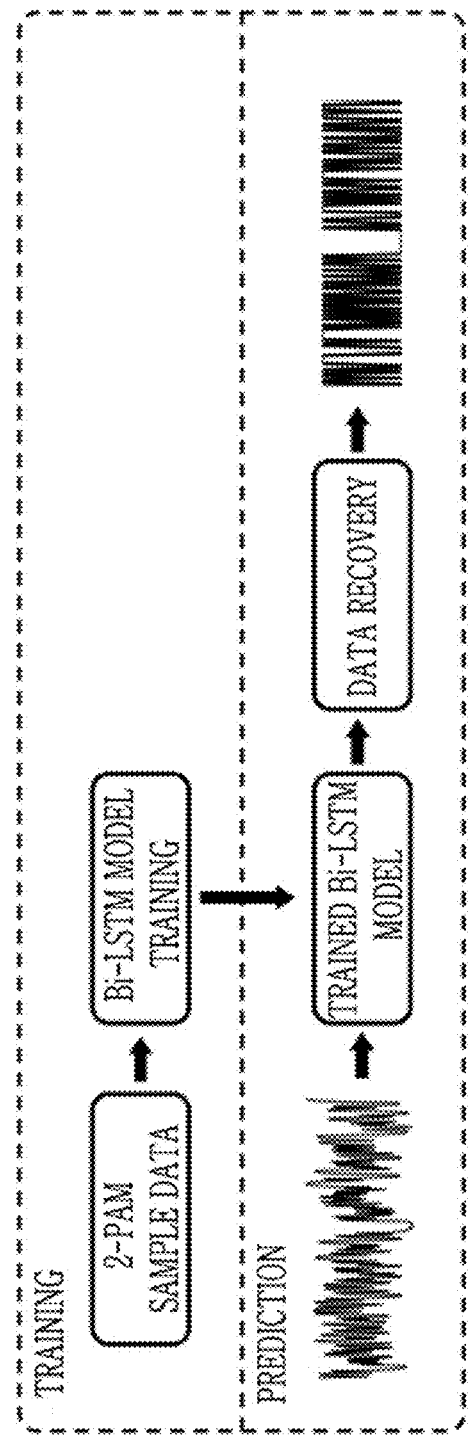
FIG. 7 is a diagram illustrating a training and prediction method of an ML demodulator according to some example embodiments.

FIG. 4 is a flowchart illustrating a method for transmitting and receiving an optical signal according to some example embodiments, FIG. 5 is a graph illustrating the frequency response of an OPD supplied with different reverse bias according to some example embodiments, FIG. 6 is a schematic diagram illustrating a machine learning structure of an ML demodulator of the receiver according to some example embodiments, and FIG. 7 is a diagram illustrating a training and prediction method of an ML demodulator according to some example embodiments.

Referring to FIG. 4, the encoder 120 of the transmitter 100 may encode bits to be transmitted to the receiver 200 into a pulse signal (S110). The encoder 120 may encode bits according to the modulation level determined by the controller 110.

The pre-equalizer 130 may perform pre-equalization on the encoded signal (S120). The pre-equalizer 130 may perform the pre-equalization according to the particular (or, alternatively, predetermined) equalization parameter (bandwidth, transfer function, etc.), which may be stored at the transmitter 100 (e.g., in a memory thereof), or perform the pre-equalization based on information about (e.g., information associated with) the frequency response (or the transfer function) of the organic photoelectric conversion device 210 of the receiver 200, where such information may be stored at the transmitter 100 (e.g., in a memory thereof). In some example embodiments, the transmitter 100 may receive information about the frequency response of the organic photoelectric conversion device 210 from the receiver 200 (e.g., via communication interface 190).

The driver 140 of the transmitter 100 may modulate the pre-equalized signal and drive the modulated signal to the light source 150 (S130). Thereafter, the optical signal (e.g., modulated pre-equalized signal) may be output (e.g., transmitted, emitted, etc.) from the light source 150 (and thus transmitted from the transmitter 100) and may be received by the receiver 200 (S135).

The organic photoelectric conversion device 210 of the receiver 200 may convert the pre-equalized optical signal into an electrical signal (S140). Since the organic photoelectric conversion device 210 converts the pre-equalized optical signal into the electrical signal, inter-symbol interference may be reduced even at a transmission speed with a high bandwidth of the organic photoelectric conversion device 210, thereby improving operational performance of at least the receiver 200, and a system including same, based on the optical signals that are received at the organic photoelectric conversion device 210 pre-equalized by the transmitter.

The frequency characteristic of the organic photoelectric conversion device may be improved according to the magnitude of the reverse voltage supplied to the organic photoelectric conversion device 210.

Referring to FIG. 5, when the reverse bias of 0V is supplied to the OPD, the 3 dB bandwidth of the OPD may be about 0.12 MHz. When the reverse bias of 3V is supplied to the OPD, the 3 dB bandwidth of the OPD may be about 0.8 MHz. When the reverse bias of 3V is supplied to the OPD, the bandwidth of the OPD increases compared to when the reverse bias of 0V is supplied, but on the other hand, the noise caused by the OPD may increase relatively. That is, when a reverse bias of the appropriate magnitude suitable for the organic photoelectric conversion device 210 is supplied according to a specific communication environment, the bandwidth of the organic photoelectric conversion device 210 may be further increased.

Referring to FIG. 4, the ML demodulator 220 of the receiver 200 according to some example embodiments may demodulate the electrical signal by inputting the electrical signal converted by the organic photoelectric conversion device 210 to the trained artificial neural network (S150). The ML demodulator 220 according to some example embodiments may demodulate the received signal using a ML model that includes a bi-direction long-short-term memory (Bi-LSTM) neural network.

LSTM is a technique that processes temporally continuous data by applying signals of the previous time step to the current time step, and is a type of Recurrent Neural Network (RNN). Bi-LSTM may include two LSTM layers configured in series/in parallel. Data (training data or test data) may be input in a forward direction to one LSTM layer included in the Bi-LSTM and data may be input in a reverse direction to the other LSTM layer. The ML demodulator 220 using the Bi-LSTM neural network may have bi-directionality through the two LSTM layers to which data is input in forward/reverse direction, respectively.

Referring to FIG. 6, an artificial neural network (e.g., a trained artificial neural network) of the ML demodulator 220 (e.g., implemented by the ML demodulator 220, the receiver 200, or the like) according to some example embodiments may include two LSTM layers, a concatenation layer, a fully connected layer, a SoftMax layer, and a classification layer.

Each of the two LSTM layers to which data is input in different directions may train a weight where the weight generated in each LSTM layer may be output as a final weight after being connected in the concatenated layer. Here, at least one LSTM layer may be additionally inserted. However, if the at least one LSTM layer is excessively inserted, the ML demodulator 220 may over-learn the data, and in some example embodiments, overfitting may occur in which the error decreases for the training data but increases with the test data. To prevent such overfitting or reduce the occurrence of such overfitting, a drop out layer may be inserted behind the LSTM layer. At the end of the artificial neural network of the ML demodulator 220, the fully connected layer, the SoftMax layer, and the classification layer may be positioned to predict a class label of the training data or the test data.

Since an LSTM layer that processes data in a reverse direction is added to the Bi-LSTM model of the ML demodulator 220 according to some example embodiments, when data is sequentially input according to time, not only the relationship between the current data and the previous data but also the relationship between the current data and the subsequent data can also be learned by the ML model of the ML demodulator 220, so the performance of the receiver 200 of recovering signals distorted by the noise is excellent, thereby improving the operational performance of at least the receiver 200 and a system including same.

Referring to FIG. 7, the ML demodulator 220 may train an ML model that includes the Bi-LSTM model using the 2-PAM (pulse amplitude modulation) signal as input data and then the trained Bi-LSTM model may demodulate data from the electrical signal converted by the organic photoelectric conversion device 210. Therefore, communication performance from the distorted received signal can be improved.

Referring to FIG. 4, the SINR estimator 240 of the receiver 200 may estimate the SINR from the demodulated data (S160) and the receiver 200 may feedback (e.g., transmit) the estimated SINR to the transmitter 100 (S170). In addition, the decoder of the receiver 200 may decode the demodulated data to restore the bits (S180).

The feedback of the receiver 200 may correspond to the pre-equalized reference signal. When the receiver 200 feeds back (e.g., transmits) information about the SINR of the reference signal to the transmitter 100, the receiver 200 may also transmit the information about the frequency response of the organic photoelectric conversion device 210 to the transmitter 100 together.

The controller 110 of the transmitter 100 may adjust the transmission parameter based on the SINR fed back from the receiver 200 (S190). That is, the controller 110 may perform adjustment for the encoding, the pre-equalization, and the driving of the optical signal based on the feedback SINR. For example, the controller 110 of the transmitter 100 may adjust the equalization bandwidth or the impulse response used for pre-equalization based on the feedback SINR. That is, the pre-equalizer 130 may perform re-pre-equalization on the pulse signal based on the information about the SINR of the reference signal and/or the frequency response of the organic photoelectric conversion device 210. In addition, the controller 110 may adjust the modulation level for the encoding and the modulation depth for the modulation of signals based on the feedback SINR.

In some example embodiments, at least one of the pre-equalization of the encoded signal at S120 or the inputting the electrical signal to a trained artificial neural network at S150 may be omitted. For example, in some example embodiments, the transmitter 100 may omit a pre-equalizer 130, such that operation S120 is omitted from the method shown in FIG. 4 and the signal driven to the light source 150 at S130 and the optical signal transmitted at S135 are not pre-equalized, and operations S170 and S190 may be omitted based on an absence of a pre-equalizer 130, while the receiver 200 (e.g., the ML demodulator 220) may demodulate the electrical signal (converted from an optical signal at S140) at S150 based on inputting the electrical signal to a trained artificial neural network. In another example, in some example embodiments, the transmitter 100 may include the pre-equalizer 130, such that operation S120 is performed, while the receiver 200 (e.g., the ML demodulator 220) may demodulate the electrical signal (converted from an optical signal at S140) at S150 without inputting the electrical signal to a trained artificial neural network (e.g., based on applying a stored demodulation algorithm to the electrical signal).

Figure 8:
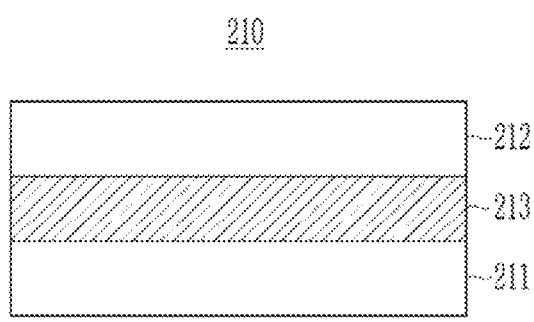
FIG. 8 is a cross-sectional view illustrating an organic photoelectric conversion device according to some example embodiments.
Figure 9:
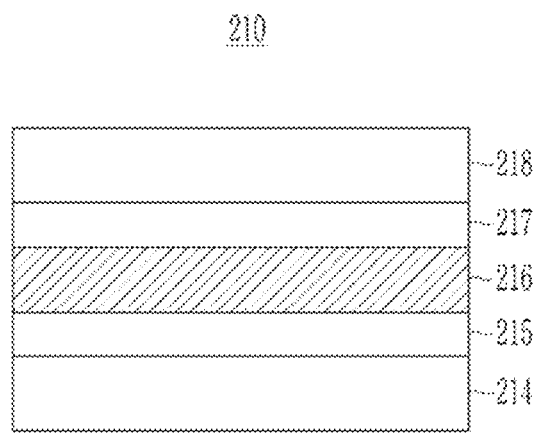
FIG. 9 is a cross-sectional view illustrating an organic photoelectric conversion device according to some example embodiments.

FIG. 8 is a cross-sectional view illustrating an organic photoelectric conversion device according to some example embodiments and FIG. 9 is a cross-sectional view illustrating an organic photoelectric conversion device according to some example embodiments.

In FIG. 8 and FIG. 9, the thickness is enlarged to clearly express various layers and regions. Like reference numerals designate like elements throughout the specification. When a part, such as a layer, membrane, region, or plate, is "on" another part, it may include not only the case where it is "directly on" another part, but also the case where there is another part in between. In contrast, when an element is referred to as being "directly on" another element, there may be no intervening elements present.

Referring to FIG. 8, the organic photoelectric conversion device 210 according to some example embodiments may include a first electrode 211 and a second electrode 212 facing each other and an active layer 213 positioned between the first electrode 211 and the second electrode 212.

One of the first electrode 211 or the second electrode 212 may be an anode and the other may be a cathode. At least one of the first electrode 211 or the second electrode 212 may be a light-transmitting electrode. The light-transmitting electrode may be made of (e.g., may comprise), for example, a transparent conductor such as indium tin oxide (ITO) or indium zinc oxide (IZO) or a single-layer with a thin thickness or multi-layer metal thin film. When one of the first electrode 211 or the second electrode 212 is an opaque electrode, the opaque electrode may be made of an opaque conductor such as aluminum (Al).

For example, both the first electrode 211 and the second electrode 212 may be the light-transmitting electrodes.

The active layer 213 may include a p-type semiconductor and an n-type semiconductor, and a pn junction may be formed in the active layer 213. The PN junction may be a bulk heterojunction containing a mixture of P-type material (P-type semiconductor) and N-type material (N-type semiconductor) or a planar heterojunction in which the P-type material and the N-type material are stacked, respectively. In the active layer 213, light transmitted from the outside of the organic photoelectric conversion device may generate excitons in the active layer 213, and the generated excitons may be separated into holes and electrons in the active layer 213.

The active layer 213 may include a first compound as the p-type semiconductor or the n-type semiconductor.

The first compound may be a light absorber capable of selectively absorbing light of a particular (or, alternatively, predetermined) wavelength band among visible ray regions. For example, the first compound may selectively absorb light in a green wavelength band. For example, the maximum absorption wavelength (λmax) of the first compound may be between about 500 nm to 600 nm and may have an energy bandgap of about 2.0 to 2.5 eV.

For example, the first compound may be a p-type semiconductor that may be an organic material having a core structure including an electron donating moiety EDM, a π-conjugated linking moiety LM, and an electron accepting moiety EAM according to Chemical Formula 1.

EDM-LM-EAM        [Chemical Formula 1]

In Chemical Formula 1,

EDM may be an electron donating moiety,

EAM may be an electron accepting moiety, and

LM may be a pi conjugated linking moiety to link the electron donating moiety and the electron accepting moiety.

For example, the active layer 213 may include a first compound as the p-type semiconductor that may be represented by Chemical Formula 2.

[Chemical Formula 2]

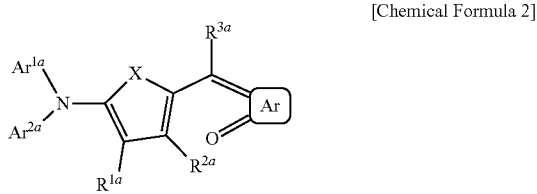

In Chemical Formula 2,

X may be O, S, Se, Te, SO, $SO_2$, $CR^bR^c$, or $SiR^dR^e$,

Ar may be a substituted or unsubstituted C6 to C30 arylene group, a substituted or unsubstituted C3 to C30 heterocyclic group, or a fused ring of two or more selected therefrom, $Ar^{1a}$ and $Ar^{2a}$ may each independently be a substituted or unsubstituted C6 to C30 aryl(ene) group or a substituted or unsubstituted C3 to C30 heteroaryl(ene) group, $R^{1a}$ to $R^{3a}$ and $R^b$ to $R^e$ may each independently be hydrogen, a substituted or unsubstituted C1 to C30 alkyl group, a substituted or unsubstituted C1 to C30 alkoxy group, a substituted or unsubstituted C6 to C30 aryl group, a substituted or unsubstituted C3 to C30 heteroaryl group, a halogen, a cyano group, or any combination thereof, and $Ar^{1a}$, $Ar^{2a}$, $R^{1a}$, and $R^{2a}$ may each independently be present, or two adjacent ones may be linked to each other to form a ring.

For example, $Ar^{1a}$ and $Ar^{2a}$ may each independently be a substituted or unsubstituted phenyl group, a substituted or unsubstituted naphthyl group, a substituted or unsubstituted anthracenyl group, a substituted or unsubstituted phenanthrenyl group, a substituted or unsubstituted pyridinyl group, a substituted or unsubstituted pyridazinyl group, a substituted or unsubstituted pyrimidinyl group, a substituted or unsubstituted pyrazinyl group, a substituted or unsubstituted quinolinyl group, a substituted or unsubstituted isoquinolinyl group, a substituted or unsubstituted naphthyridinyl group, a substituted or unsubstituted cinnolinyl group, a substituted or unsubstituted quinazolinyl group, a substituted or unsubstituted phthalazinyl group, a substituted or unsubstituted benzotriazinyl group, a substituted or unsubstituted pyridopyrazinyl group, a substituted or unsubstituted pyridopyrimidinyl group, or a substituted or unsubstituted pyridopyridazinyl group.

For example, $Ar^{1a}$ and $Ar^{2a}$ may be linked to each other to form a ring.

For example, $Ar^{2a}$ and $R^{1a}$ may be linked to each other to form a ring.

For example, the active layer may include an n-type semiconductor, in addition to a first compound that is the p-type semiconductor, that may be fullerene or a fullerene derivative, thiophene or a thiophene derivative, or any combination thereof, but is not limited thereto.

Referring to FIG. 9, the organic photoelectric conversion device 210 according to some example embodiments may include a first electrode 214 and a second electrode 218 facing each other and an active layer 216 positioned between the first electrode 214 and the second electrode 218.

Also, the organic photoelectric conversion device 210 according to some example embodiments may further include charge auxiliary layers 215 and 217 between the first electrode 214 and the active layer 216 and between the second electrode 218 and the active layer 216, respectively. The charge auxiliary layers 215 and 217 may facilitate the movement of holes and electrons separated from the active layer 216, thereby increasing efficiency.

The charge auxiliary layers 215 and 217 may include at least one selected from a hole injecting layer (HIL) that facilitates hole implantation, a hole transporting layer (HTL) that facilitates hole transport, an electron blocking layer (EBL) that blocks the movement of electrons, an electron injecting layer (EIL) that facilitates electron implantation, an electron transporting layer (ETL) that facilitates the transport of electrons, and a hole blocking layer (HBL) that blocks the movement of holes.

The charge auxiliary layers 215 and 217 may include, for example, an organic material, an inorganic material, or an organic/inorganic material. The organic material may be an organic compound having hole or electron characteristics, and the inorganic material may be, for example, a metal oxide such as molybdenum oxide, tungsten oxide, or nickel oxide.

The hole transport layer (HTL) may include one selected from, for example, a poly(3,4-ethylenedioxythiophene):poly (styrenesulfonate) (PEDOT:PSS), a polyaryl amine, a poly (N-vinylcarbazole), a polyaniline, a polypyrrole, an N,N,N', N'-tetrakis(4-methoxyphenyl)-benzidine (TPD), a 4-bis[N-(1-naphthyl)-N-phenyl-amino]biphenyl (α-NPD), an m-MTDATA, a 4,4',4"-tris(N-carbazolyl)-triphenylamine (TCTA), and any combination thereof, but is not limited thereto.

The electron blocking layer (EBL) may include one selected from, for example, a poly(3,4-ethylenedioxythiophene):poly(styrenesulfonate), (PEDOT:PSS), a poly Arylamine, a poly(N-vinylcarbazole), a polyaniline, a polypyrrole, an N,N,N',N'-tetrakis (4-methoxyphenyl)-benzidine (TPD), a 4-bis[N-(1-naphthyl)-N-phenyl-amino]biphenyl (α-NPD), an m-MTDATA, a 4,4',4"-tris(N-carbazolyl)-triphenylamine (TCTA), and any combination thereof, but is not limited thereto.

The electron transport layer (ETL) may include one selected from, for example, a 1,4,5,8-naphthalene-tetracarboxylic dianhydride (NTCDA), a bathocuproine (BCP), an LiF, an Alq3, a Gaq3, an Inq3, a Znq2, a Zn(BTZ)2, a BeBq2 and any combination thereof, but is not limited thereto.

The hole blocking layer (HBL) may include one selected from, for example, a 1,4,5,8-naphthalene-tetracarboxylic dianhydride (NTCDA), bathocuproine (BCP), an LiF, an Alq3, a Gaq3, an Inq3, a Znq2, a Zn(BTZ)2, a BeBq2 and any combination thereof, but is not limited thereto.

Any one of the charge auxiliary layers 215 and/or 217 may be omitted.

The organic photoelectric conversion device may be applied to (e.g., included in) a solar cell, an image sensor, a light detector, an optical sensor, and an organic photo diode (OPD), but is not limited thereto.

Figure 10:
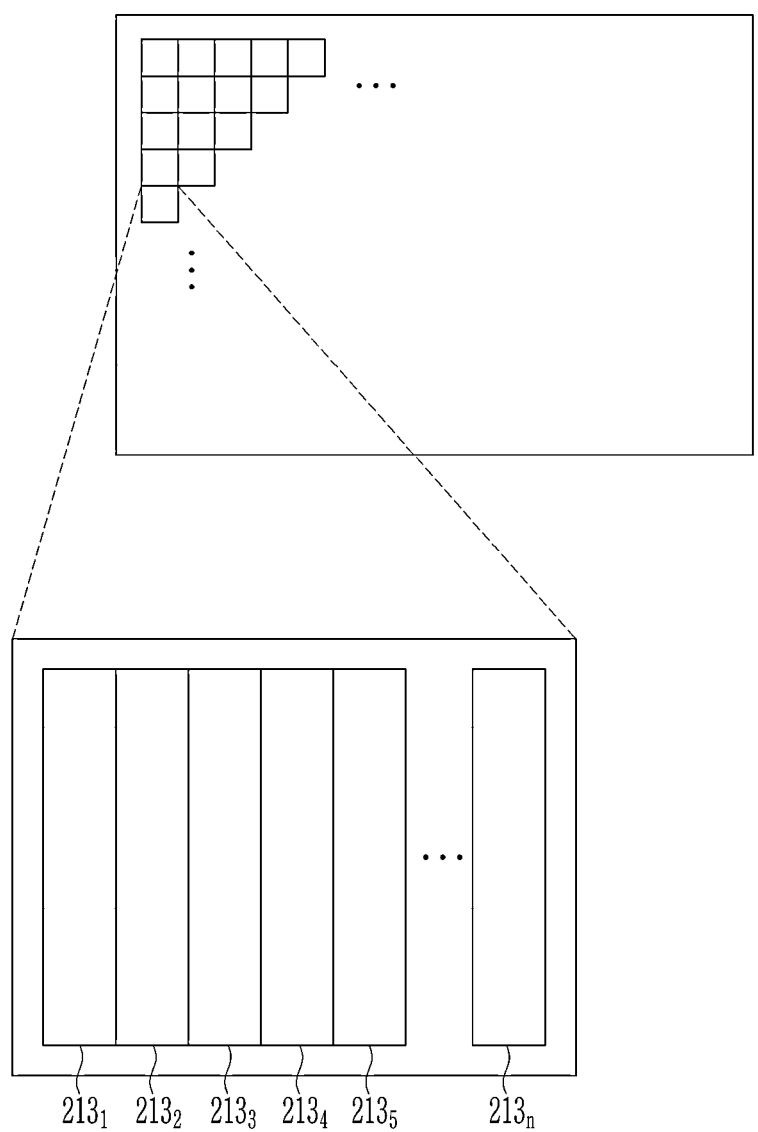
FIG. 10 is a diagram illustrating a pixel structure of an organic photoelectric conversion device according to some example embodiments.
Figure 11:
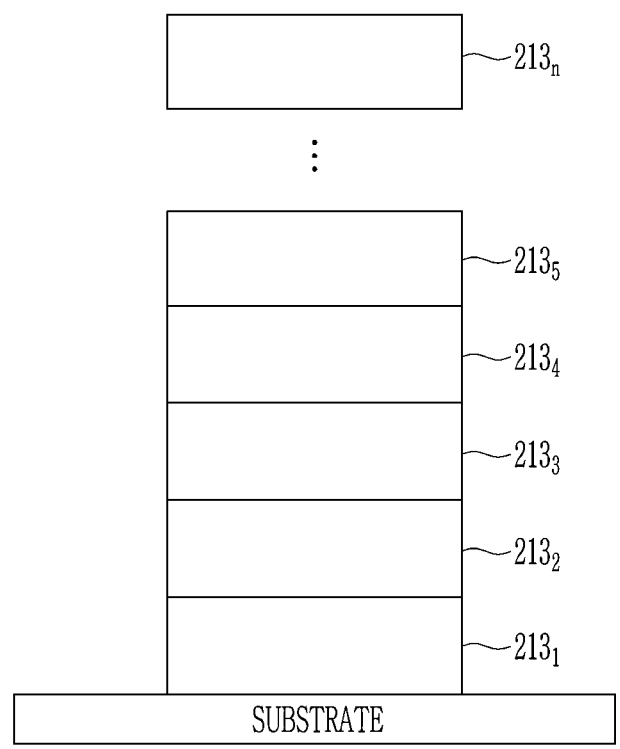
FIG. 11 is a diagram illustrating a stacking structure of an organic photoelectric conversion device according to some example embodiments.

FIG. 10 is a diagram illustrating a pixel structure of an organic photoelectric conversion device according to some example embodiments and FIG. 11 is a diagram illustrating a stacking structure of an organic photoelectric conversion device according to some example embodiments.

The organic photoelectric conversion device 210 illustrated in FIG. 10 and FIG. 11 may sequentially or simultaneously convert (e.g., photoelectrically convert) optical signals having different wavelength bands into electrical signals. When the optical signal of the first wavelength band and the optical signal of the second wavelength band are sequentially received by the receiver 200, the organic photoelectric conversion device 210 may generate electrical signals according to each optical signal through a cell or active layer corresponding to each wavelength band. In some example embodiments, when the optical signal of the first wavelength band and the optical signal of the second wavelength band simultaneously reach the receiver 200, the organic photoelectric conversion device 210 may generate electrical signals according to each optical signal through the cell or active layer corresponding to each wavelength band. That is, the photoelectric conversion capability of the organic photoelectric conversion device 210 may be determined according to (e.g., may be based on) a wavelength band corresponding to a cell or an active layer included in the organic photoelectric conversion device 210.

Referring to FIG. 10, the organic photoelectric conversion device 210 according to some example embodiments may include a plurality of pixelated cells on a substrate. Each cell in the organic photoelectric conversion device 210 may include a plurality of active layers $213_1$ to $213_n$ (e.g., a separate plurality of active layers $213_1$ to $213_n$) having a two-dimensional array structure, and a plurality of active layers $213_1$ to $213_n$ may correspond to different wavelength bands, where "n" may be any positive integer.

A plurality of cells included in the organic photoelectric conversion device 210 may be pixelated on a plane, and a plurality of active layers $213_1$ to $213_n$ of each cell may correspond to a plurality of wavelength bands, respectively, where "n" may be any positive integer. For example, among the active layers in the cell where "n" is equal to or greater than 5, the first active layer $213_1$ may correspond to the infrared band, the second active layer $213_2$ may correspond to the red light band (e.g., red light), the third active layer $213_3$ may correspond to the green light band (e.g., green light), the fourth active layer $213_4$ may correspond to the blue light band (e.g., blue light), and the fifth active layer $213_5$ may correspond to the near-ultraviolet band (e.g., near-ultraviolet light). Each cell may include all of the first active layer to the fifth active layer, and may include a limited portion of the first to fifth active layers, for example some active layers among the first active layer to the fifth active layer, if necessary.

For example, when each cell of the organic photoelectric conversion device 210 includes the second active layer $213_2$, the third active layer $213_3$, and the fourth active layer $213_4$, the organic photoelectric conversion device 210 may convert all optical signals in the visible ray band into electrical signals. In some example embodiments, when each cell of the organic photoelectric conversion device 210 includes a limited portion of the first to fifth active layers, for example including the first active layer $213_1$ and the third active layer $213_3$ and excluding at least the second active layer $213_2$ and the fourth active layer $213_4$, the organic photoelectric conversion device 210 may convert an optical signal of the infrared band and an optical signal of the green light band into electrical signals. In some example embodiments, the plurality of pixelated cells may include different two-dimensional arrays of different combinations of active layers corresponding to different combinations of wavelength bands, such that separate two-dimensional arrays in separate cells (e.g., different pluralities of active layers in at least two separate cells) may be configured to absorb and photoelectrically convert (e.g., convert to one or more electrical signals) optical signals of different sets of one or more wavelength bands (e.g., different combinations of wavelength bands).

FIG. 11 is a diagram illustrating a stacking structure of one cell of an organic photoelectric conversion device according to some example embodiments.

Each cell in the stacked organic photoelectric conversion device 210 according to some example embodiments may include a plurality of active layers $213_1$ to $213_n$ (e.g., a separate plurality of active layers $213_1$ to $213_n$) of (e.g., having) a three-dimensional stacking structure, and a plurality of active layers $213_1$ to $213_n$ may correspond to different wavelength bands, where "n" may be any positive integer.

Referring to FIG. 11, the first active layer $213_1$ stacked on the substrate may convert the optical signal of the red light band into an electrical signal, the second active layer $213_2$ stacked on the first active layer $213_1$ may convert the optical signal of the green light band into an electrical signal, and the third active layer $213_3$ stacked on the second active layer $213_2$ may convert an optical signal of the blue light band into an electrical signal. Here, the stacked active layers may be separated from each other by a transparent separation layer therebetween. In some example embodiments, the plurality of pixelated cells may include different three-dimensional stacking structures of different combinations of active layers corresponding to different combinations of wavelength bands, such that separate three-dimensional stacking structures in separate cells (e.g., different pluralities of active layers in at least two separate cells) may be configured to absorb and photoelectrically convert (e.g., convert to one or more electrical signals) optical signals different sets of one or more wavelength bands (e.g., different combinations of wavelength bands).

Referring to FIGS. 10 and 11, in some example embodiments, the organic photoelectric conversion device 210 according to some example embodiments may include a plurality of pixelated cells on a substrate, where separate cells may include a separate one of a plurality of active layers $213_1$ to $213_n$ (e.g., a separate plurality of active layers $213_1$ to $213_n$) corresponding to different wavelength bands having a two-dimensional array structure or a plurality of active layers $213_1$ to $213_m$ (e.g., a separate plurality of active layers $213_1$ to $213_m$) of (e.g., having) a three-dimensional stacking structure ("n" and "m" each independently being any positive integer), such that the plurality of pixelated cells collectively include both one or more two-dimensional arrays of active layers and one or more three-dimensional stacking structures of active layers. The two-dimensional array(s) and three-dimensional stacking structure(s) may include different combinations of active layers corresponding to different combinations of wavelength bands, such that separate two-dimensional arrays or three-dimensional stacking structures of separate pluralities of active layers in at least two separate cells of the plurality of pixelated cells may be configured to absorb and photoelectrically convert (e.g., convert to one or more electrical signals) optical signals different sets of one or more wavelength bands (e.g., different combinations of wavelength bands).

As described above, the wireless optical communication system according to some example embodiments can reduce or minimize the influence of nonlinear distortion, noise, and inter-symbol interference through the combination of the pre-equalizer of the transmitting end (e.g., the transmitter 100) and the ML demodulator of the receiving end (e.g., the receiver 200), and the performance of high-speed wireless optical communication can be improved.

Figure 12A:
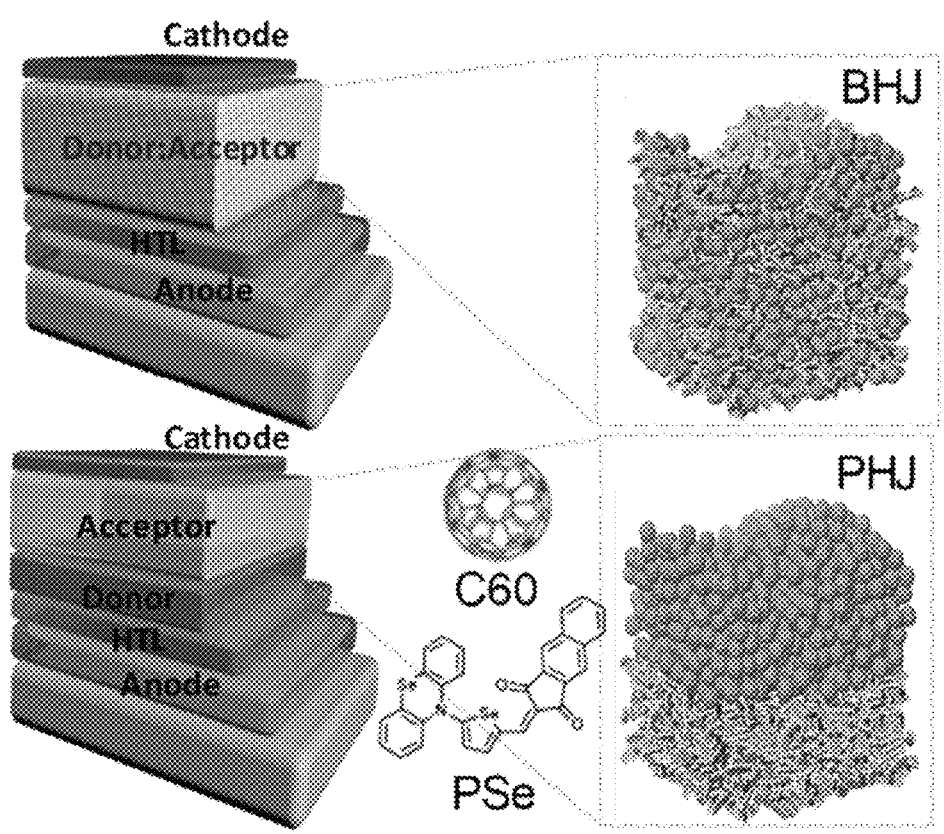
FIG. 12A includes schematic diagrams of two different types of OPD devices and their photoelectric conversion layers; BHJ and PHJ according to some example embodiments.
Figure 12B:
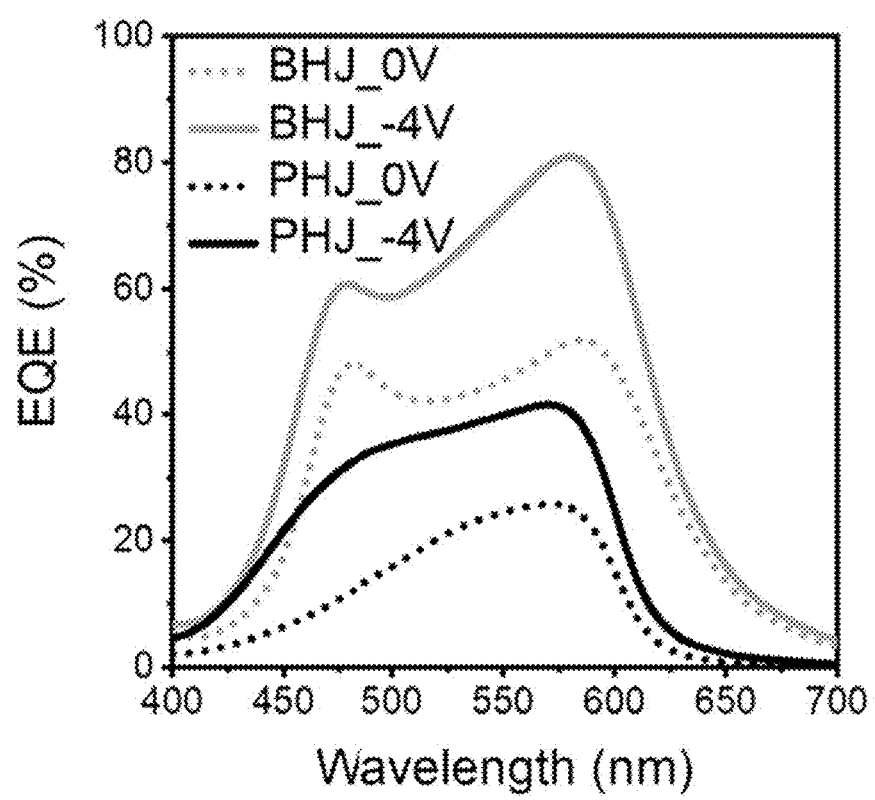
FIG. 12B is a graph illustrating EQE spectra of both devices under 0V and −4V according to some example embodiments.
Figure 12C:
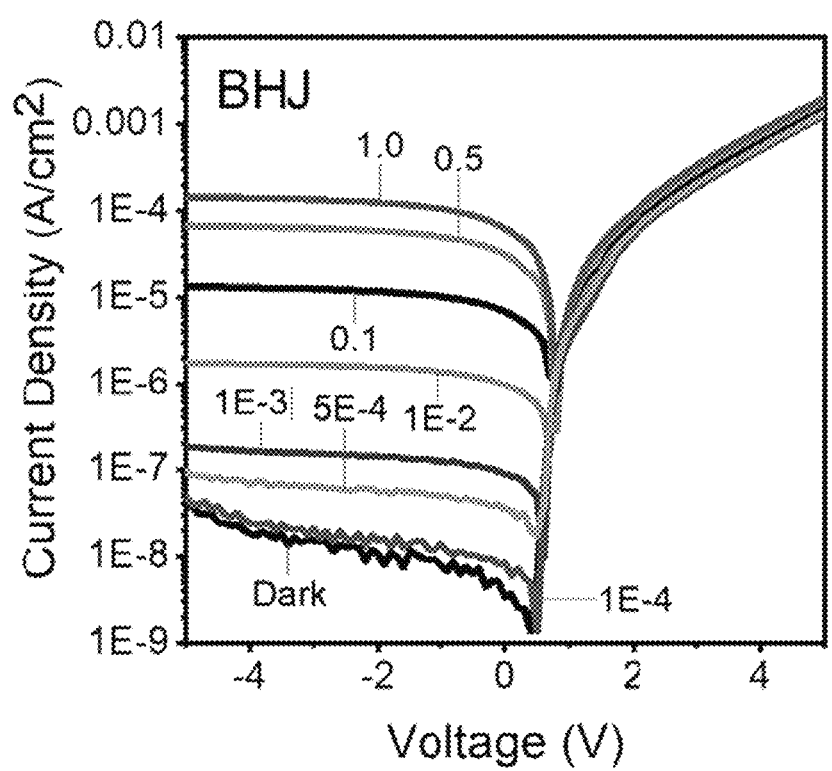
FIG. 12C is a graph illustrating photo J-V spectra of BHJ-OPD varying intensity of incident light according to some example embodiments.
Figure 12D:
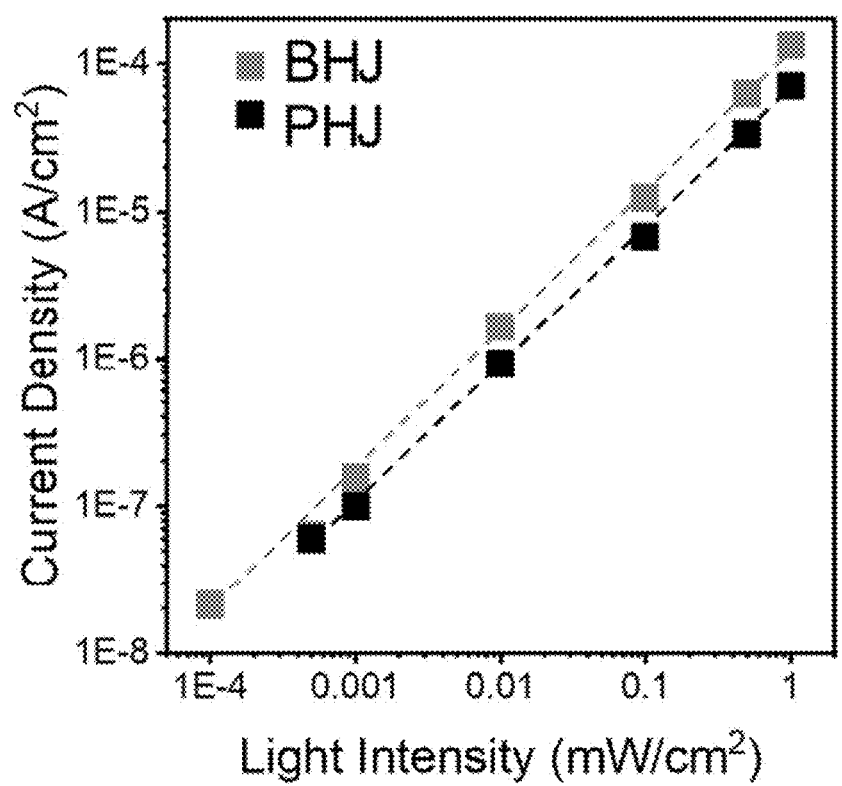
FIG. 12D is a graph illustrating photocurrent density properties at an operating voltage of −4V as a function of the light intensity according to some example embodiments.
Figure 12E:
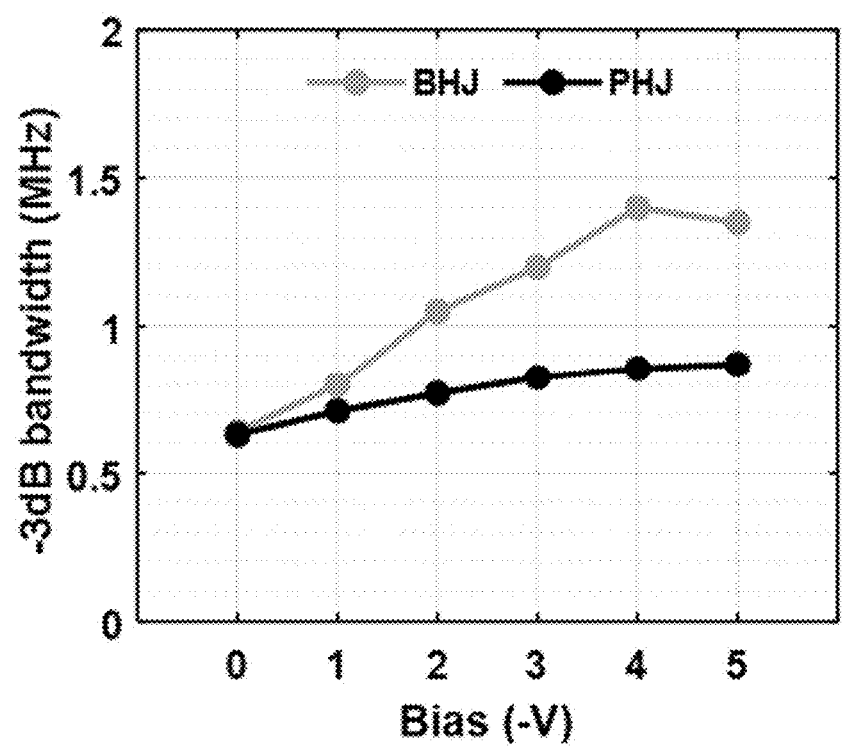
FIG. 12E is a graph illustrating the change in −3 dB bandwidth depending on the bias supplied to the OPD according to some example embodiments.
Figure 13:
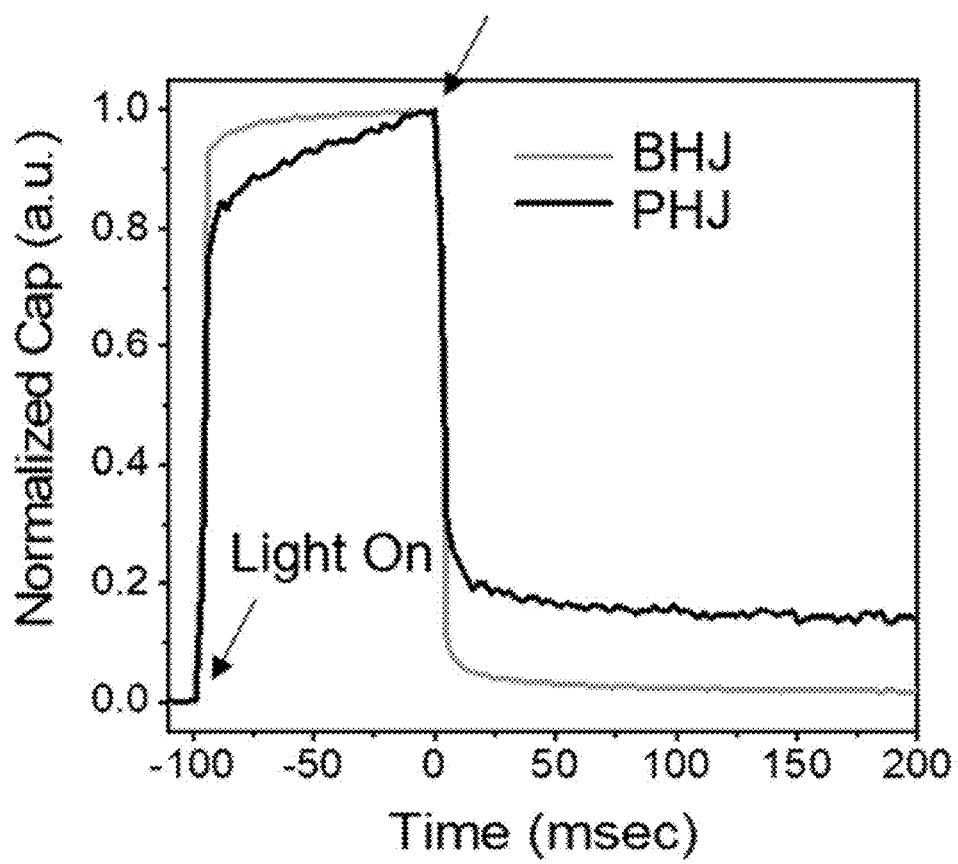
FIG. 13 is a graph illustrating the normalized capacitance change of the OPD according to some example embodiments.
Figure 14:
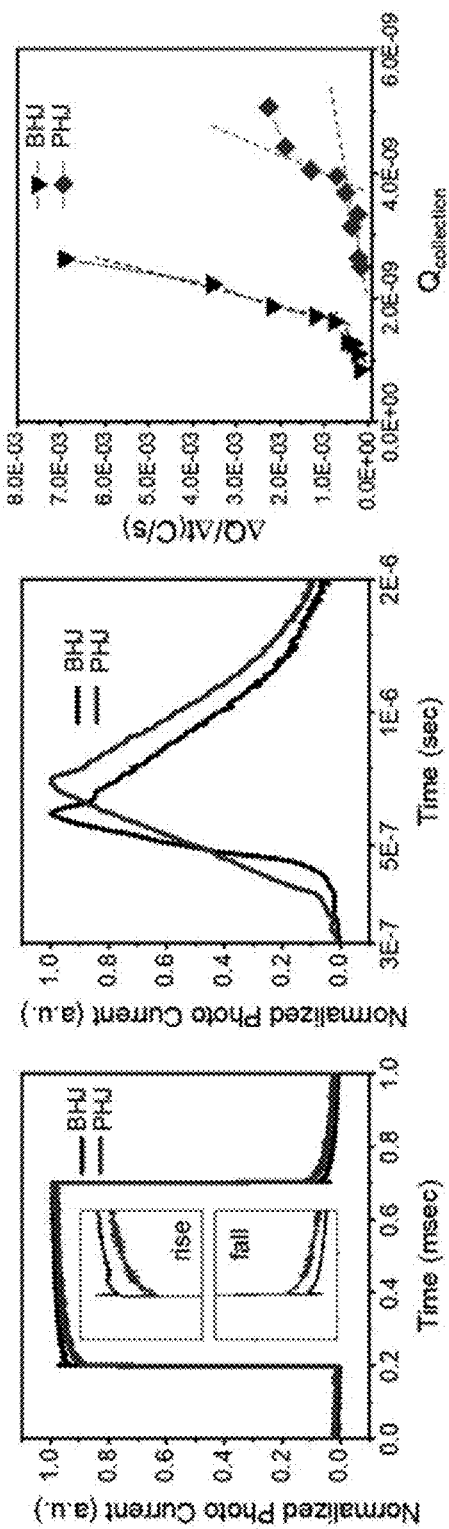
FIG. 14 is a graph illustrating the response speed of the OPD according to some example embodiments.
Figure 15:
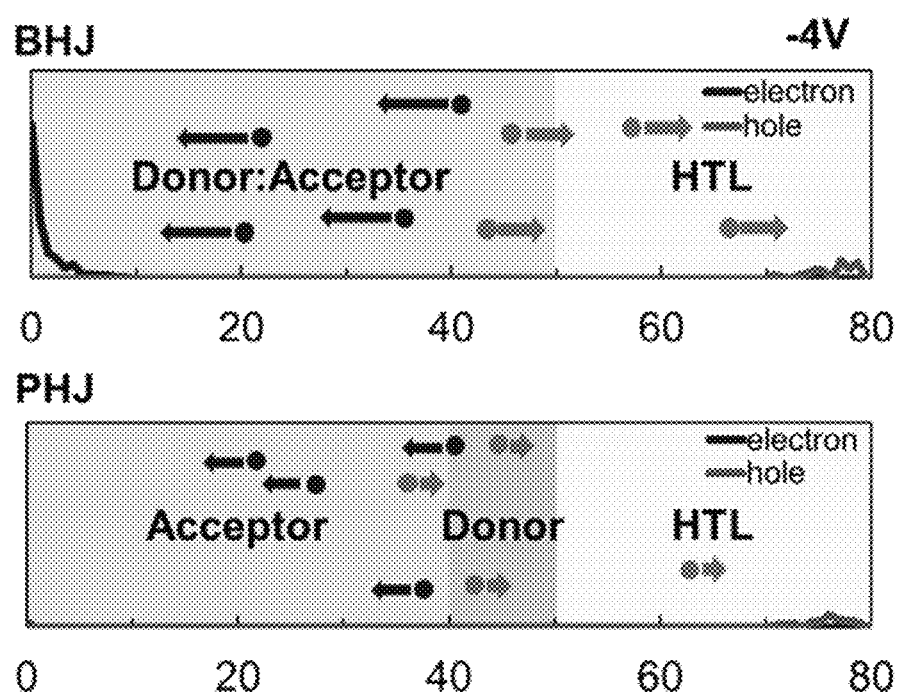
FIG. 15 is a schematic diagram illustrating the movement of a charge carrier having a density profile along a vertical axis of an electrode interface according to some example embodiments.
Figure 16:
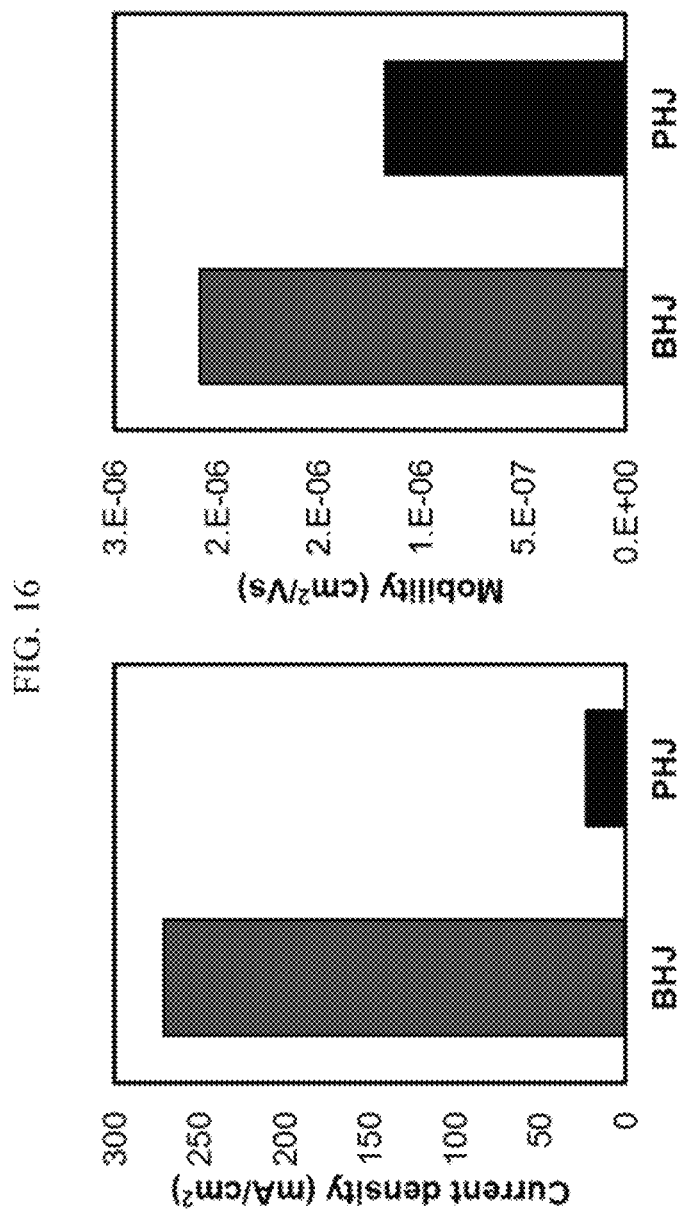
FIG. 16 is a graph illustrating the current density and mobility of a charge carrier according to some example embodiments.

FIG. 12A includes schematic diagrams of two different types of OPD devices and their photoelectric conversion layers; BHJ and PHJ, according to some example embodiments. FIG. 12B is a graph illustrating EQE spectra of both devices under 0V and −4V according to some example embodiments. FIG. 12C is a graph illustrating photo J-V spectra of BHJ-OPD varying intensity of incident light according to some example embodiments. FIG. 12D is a graph illustrating photocurrent density properties at an operating voltage of −4V as a function of the light intensity according to some example embodiments. FIG. 12E is a graph illustrating the change in −3 dB bandwidth depending on the bias supplied to the OPD according to some example embodiments, FIG. 13 is a graph illustrating the normalized capacitance change of the OPD according to some example embodiments, FIG. 14 is a graph illustrating the response speed of the OPD according to some example embodiments, FIG. 15 is a schematic diagram illustrating the movement of a charge carrier having a density profile along a vertical axis of an electrode interface according to some example embodiments, and FIG. 16 is a graph illustrating the current density and mobility of a charge carrier according to some example embodiments.

In some example embodiments, an organic photo diode (OPD) used as an organic photoelectric conversion device may be manufactured through processes such as vacuum thermal deposition, solution casting, inkjet printing, and the like, and may have high conversion efficiency and fast response speed. A microcavity introduced into the OPD may be a structure for selectively absorbing light with high conversion efficiency and fast response speed, and the OPD having the microcavity may be suitable to be used as a light receiver for visible light communication (VLC). Since the optical response speed of the OPD depends on the strength of the effective electric field under a fixed bias condition, the OPD may be manufactured with a relatively thin thickness. That is, the entire thickness of the OPD may be minimized by using the microcavity (e.g., thinner than 100 nm), and thus the effective electric field supplied to the OPD may be maximized under a fixed external electric bias condition.

In some example embodiments, the OPD may include, on a substrate having a reflective electrode (ITO/Ag/ITO), a hole transfer layer (HTL), a photoelectric conversion layer, and a semi-transparent electrode. A 30 nm thick HTL deposited on a substrate with ITO/Ag/ITO pattern may help hole movement from the photoelectric conversion film to the cathode, and prevent unwanted leakage current flow through the OPD.

In some example embodiments, the photoelectric conversion layer may be a bulk hetero-junction (BHJ) or a planar hetero-junction (PHJ). As a communication receiver, the OPD needs to have high response speed and photoelectric conversion efficiency for rapidly changing optical signals.

An absorber layer containing donors and acceptors may be deposited to form well-mixed junctions in the BHJ or layer-to-layer junctions in the PHJ. As the donor material, a novel donor-π-acceptor molecule (PSe) combined with two fused-type heterocyclic donors and an electron-accepting unit may be used, and an acceptor fullerene may be selected as the acceptor. On the upper portion of the OPD, a semi-transparent metal cathode (e.g., silver (Ag)) having a thickness of 15 nm) may be deposited, thereby microcavities may be formed. For example, the translucent cathode may have a low sheet resistance of 15.4 ohm/sq and a transparency of 67.8%.

In some example embodiments, incident light (e.g., an optical signal) may be absorbed by the photoelectric conversion layer, reflected at the anode, and partially reflected back at the cathode. As the incident light is continuously reflected from the anode and cathode, optical resonance can be induced and light absorption efficiency can be improved. In addition, optical resonance occurring in the microcavity of the OPD may maximize absorption of the incident light through the photoelectric conversion layer, and incident photons may be effectively converted into electrons at each junction interface of the donor molecule and the acceptor molecule.

Below, external quantum efficiency (EQE, η) of the OPD including two different photoelectric conversion layers (i.e., BHJ and PHJ), optical response of the bias-dependent current density characteristic (photo J-V), and linearity of the photo-currents with varying light intensities (i.e., linear dynamic range (LDR)) are described. The photoelectric conversion characteristic of the OPD may be determined by measuring EQE. The EQE of the OPD may be calculated as Equation 1 below by multiplying three types of efficiencies including absorption ($\eta A$), charge separation ($\eta_{cs}$), and charge collection ($\eta_{cc}$).

$$EQE\ (\%) = \eta_A \times IQE = \eta_A \times \eta_{cs} \times \eta_{cc} \qquad \text{(Equation 1)}$$

In Equation 1, IQE is the internal quantum efficiency. When 0V bias and −4V bias is supplied to the OPD, the EQE at 550 nm of the BHJ-OPD may be 45.6% at 0V bias and 72.7% at −4V bias. This result may be sufficient to be used as a VLC receiver that converts incident photons into electrical signals. Compared with the BHJ-OPD, the EQE of the PHJ-OPD may be 24.5% and 39.9% at 0V and −4V bias, respectively.

The linear dynamic range (LDR) of the BHJ-OPD and the PHJ-OPD may be calculated by Equation 2 below.

$$LDR = 20\ \log\left(\frac{J^*_{ph}(V)}{J_D(V)}\right) \qquad \text{(Equation 2)}$$

In Equation 2, $J_D(V)$ is the dark current density of the BHJ-OPD or PHJ-OPD, and $J^*_{ph}(V)$ is the photo-current density of the BHJ-OPD or PHJ-OPD. The LDRs of the BHJ-OPD and the PHJ-OPD may be 79 dB and 65 dB, respectively. The difference between the LDR values of the two OPDs may be determined by device performance, dark current density (D.C.) ($J_D(V)$), and the EQE. The dark current density of the BHJ-OPD may be 1.54E-8 mA/cm$^2$, which is lower than that of the PHJ-OPD, which is 3.83E-8 mA/cm$^2$. Therefore, the well-mixed BHJ structure has merit in suppressing the occurrence of defects compared to the PHJ. And at the strongest light intensity, the photo-current density ($J^*_{ph}(V)$) of the BHJ-OPD is higher than $J^*_{ph}(V)$ of the PHJ-OPD at a fixed applied voltage of −4V.

As a high-speed optical wireless communication (OWC) receiver, the OPD needs to exhibit a fast response to changes in the intensity of incident light. At 0V reverse bias (i.e., no external bias), the PHJ-OPD and the BHJ-OPD may exhibit a similar −3 dB bandwidth ($f_{3\ dB}$), and at −4V bias, the −3 dB frequency of the BHJ-OPD may extend to 1.4 MHz, on the other hand, the −3 dB frequency of the PHJ-OPD may represent a slight increase of 0.85 kHz.

In FIGS. 12A-12E, the −3 dB bandwidth is illustrated when the bias voltage is supplied from 0V to −5V. Referring to FIG. 12E, The −3 dB bandwidth of the BHJ-OPD starts at 0.65 MHz (0V bias) and reaches a maximum of 1.4 MHz (−4V bias), and the −3 dB bandwidth of the BHJ-OPD slightly decreases to 1.35 MHz at −5V bias. The −3 dB bandwidth of the PHJ-OPD gradually increases to 0.85 MHz until it becomes a −5V bias.

In order to analyze the dynamic characteristics of an OPD device, several analysis techniques may be used to measure the response speed of the OPD properties to incident light. In some example embodiments, analysis techniques may include transient capacitance measurement, time dependent photo-current measurement, and time-delayed collection field (TDCF). The bandwidth of the OPD may be estimated as in Equation 3 below.

$$-3 \text{ dB} = 20 \cdot \log \frac{i(f_{3dB})}{i_0} \quad \text{(Equation 3)}$$

In Equation 3, $i_0$ and $i(f_{3\ dB})$ are the intensity of photocurrent in steady state and −3 dB bandwidth, respectively.

Considering that the OPD is a receiver that receives a rapidly changing optical signal, the OPD may be optimized to maximize the −3 dB bandwidth. The total cutoff frequency ($f_{3\ dB}$) may be calculated from the RC limited cutoff frequency ($f_{RC}$) and the transit limited cutoff frequency ($f_{tr}$) according to Equation 4.

$$\frac{1}{f_{3dB}^2} = \frac{1}{f_{RC}^2} + \frac{1}{f_{tr}^2} \quad \text{(Equation 4)}$$

The RC limit time constant $t_{RC}$ may be derived from the total series resistance ($R_s$, also presented interchangeably as R) and the capacitance of the OPD (C) according to Equation 5.

$$t_{RC} = \frac{0.35}{f_{RC}} = R_s C = R\varepsilon \frac{A}{d} \quad \text{(Equation 5)}$$

In Equation 5, E is the dielectric constant of the dielectric material. For high-speed OPD for optical communication, it is necessary to consider the area (A) of the active element and the thickness (d) of the OPD. A micro-cavity structure may be used to reduce or minimize the OPD thickness, and a single pixel region may be fixed at 2 mm×2 mm to improve the light response.

Under optical illumination, transient capacitance may be measured at 553 nm optical pulses (pulse width=100 ms, luminous intensity=1 mWcm$^{-2}$, and bias=−4V) to characterize the dynamic characteristics of the capacitance change of the OPD receiver.

FIG. 13 shows the normalized capacitance change of the BHJ-OPD and the PHJ-OPD. Since the capacitance response ($t_{rise}$, 90%=6.3 msec) of the BHJ-OPD under illumination is faster than that of the PHJ-OPD ($t_{rise}$, 90%=65.3 msec), the BHJ-OPD may be quickly stabilized to a normal state after the lighting is turned off.

The transit limited cutoff frequency associated with charge mobility may be also important in the −3 dB bandwidth of the OPD. Using light pulses of ms and ns level under light illumination, transient currents for both OPDs may be measured. The optical reaction data of the OPD is summarized in Table 1.

TABLE 1

| Type | $T_{rise}$ [ms] | $T_{fall}$ [ms] | $\mu_{TDCF}$ [cm²/Vs] | $k_2$ [cm⁻³/s] | $Q_{be}$ [C] |
| --- | --- | --- | --- | --- | --- |
| (1) BHJ | 3.2 | 3.3 | 3.6E−05 | 1.7E−10 | 1.0E−9 |
| (2) PHJ | 13.7 | 12.7 | 3.0E−05 | 1.9E−11 | 2.3E−9 |

Referring to FIG. 14, the transient optical current measurement data of the OPD device under 2 kHz pulsed light illumination (light intensity=1 mWcm$^{-2}$, wavelength λ=553 nm) are shown. The rise time ($\tau_{rise}$) and fall time ($\tau_{fall}$) of the OPD may be determined by the time taken to reach 90% of the maximum signal after lighting and 10% of the maximum signal after turning off, respectively.

The response speed of the BHJ-OPD ($\tau_{rise}$=3.2 μsec, $\tau_{fall}$=3.3 μsec) has been measured to be faster than that of the PHJ-OPD ($\tau_{rise}$=13.7 μsec, $\tau_{fall}$=12.7 μsec). After the microsecond level optical response of the OPD receiver has been measured, the effective mobility and charge recombine characteristics of the device are evaluated using transient photo-current measurements under laser illumination.

In FIG. 14, the middle graph shows the TDCF photocurrent transients measured without delay time. The sample is supplied with a pre-bias of 0.5V prior to collection and excitation with a collection voltage ($V_{coll}$) of −3V. The effective mobility $\mu_{TDCF}$ of OPD may be calculated from to according to Equation 6. The mobility of the PHJ-OPD has been calculated to be 3.0E-5 cm²/Vs and that of the BHJ-OPD has been calculated to be 3.6E-5 cm²/Vs.

$$\mu = \frac{d^2}{V \cdot t_0} \quad \text{(Equation 6)}$$

In Equation 6, d is the thickness of the organic layer.

The mobility difference between the two devices (BHJ-OPD and PHJ-OPD) may be analyzed by analysis of charge recombine dynamics through the TDCF measurement. The transient photo-current may be measured after a time delay from 300 ns to 20000 ns, and the parameters related to the recombination dynamics for each device may be obtained from the plots of differential extraction charge (ΔQ/Δt) and the collected charge ($Q_{coll}$) as in Equation 7.

$$Q_{tot}(t + \Delta t) = Q_{coll}(t + \Delta t) + Q_{pre}(t + \Delta t) \quad \text{(Equation 7)}$$

$$= Q_{tot}(t) - \frac{k_2}{eAd}\left[Q_{coll}^2(t) + 2Q_{bg}Q_{coll}(t)\right]\Delta t$$

In Equation 7, e, A, and d are the basic charge, device area, and active layer thickness, respectively, $Q_{tot}$ is the total charge, $Q_{bg}$ is the background charge, and k2 is the parameter (e.g., a fixed constant value) for bimolecular recombination. Recombination of photogenerated free charge with background charge ($Q_{bg}$) and time-independent bimolecular recombination related to k2 may be two major recombination mechanism that affects the charge mobility of the system. In the PHJ-OPD, most of the free charge mainly occurs at the interface between the n-type and p-type membranes, and it is more likely to be lost while moving to the electrode, the primary recombine, due to the background charge. However, since free charges may be generated by light through the BHJ layer, secondary recombine may be the main recombine mechanism of the BHJ-OPD. Although bimolecular recombine occurs everywhere inside the OPD in the BHJ-OPD, the BHJ-OPD may exhibit faster net charge mobility than the PHJ-OPD due to suppression of background charge generation and average movement path of free charge in a fixed electric field.

The recombine coefficient derived from the TDCF measurement with delay may explain this phenomenon. The parameter for bimolecular recombination k2 for the BHJ- OPD (1.7E-10 cm$^{-3}$/s) may be higher than for the PHJ-OPD (1.9E-11 cm$^{-3}$/s). And the primary recombination-related parameter ($Q_{bg}$) of the BHJ-OPD (1.0E-9 C) may be lower than that of the PHJ-OPD (2.3E-9 C). The faster optical response of the BHJ-OPD than that of the PHJ-OPD may be experimentally confirmed by the TDCF measurement with or without delay.

In addition, the charge transport mechanism of the two OPDs may be confirmed through kMC (kinetic Monte Carlo) simulation. The charge transport may be calculated by the kMC simulation using parameters calculated by DFT calculations for atomistic morphologies.

Referring to FIG. 15, the movement of charge carriers (electrons and holes) with a density profile along the vertical axis of the electrode interface obtained by the kMC simulation using the initial charges of hundreds of randomly disposed electrons and holes in the organic layer is shown. In the case of the BHJ, some electrons may be collected at the electrode interface, but charge may be excluded from the organic layer to the electrode without charge accumulation at the interface between the organic layers.

Referring to FIG. 16, the current density and mobility of charge carriers in the BHJ-OPD and the PHJ-OPD are shown. The charge mobility of the BHJ-OPD is higher than that of the PHJ, which also means that the charge mobility of the BHJ is higher than that of the PHJ.

Figure 17:
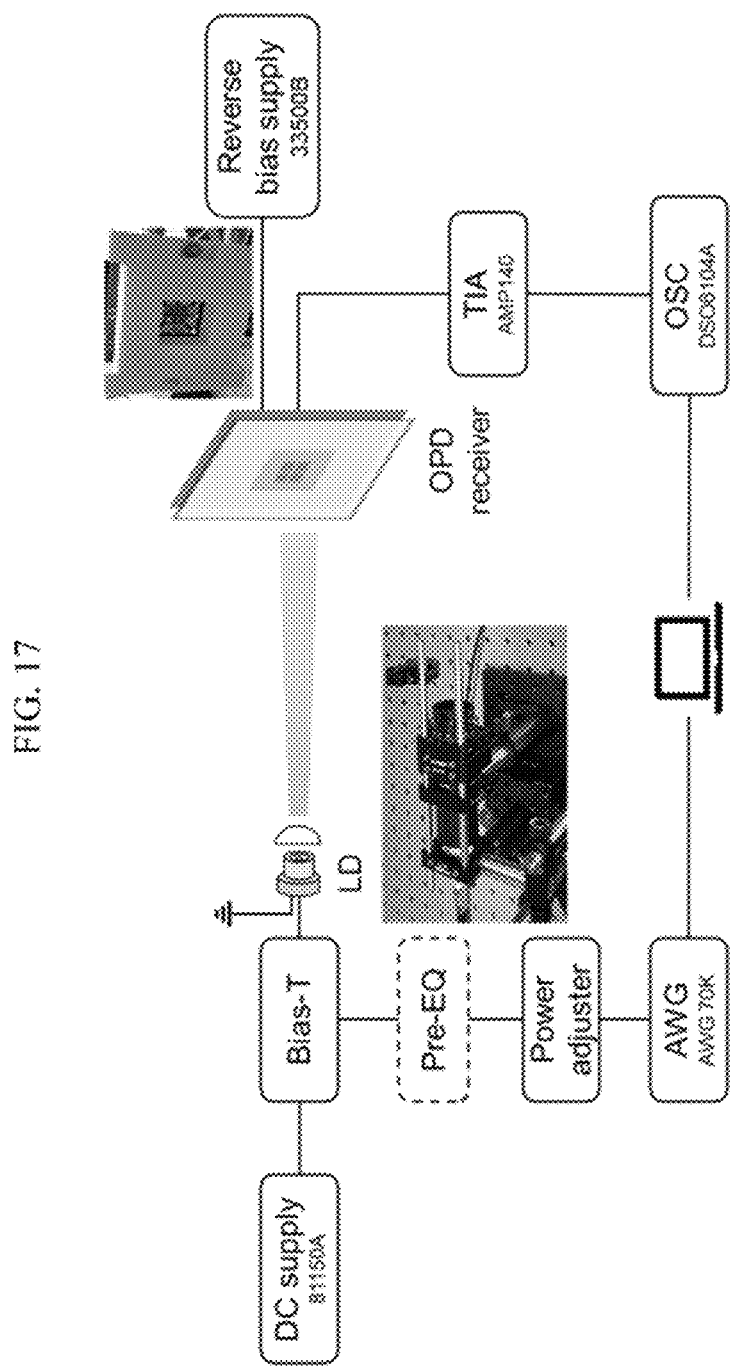
FIG. 17 is a schematic diagram illustrating a BHJ-OPD based communication system according to some example embodiments.

FIG. 17 is a schematic diagram illustrating a BHJ-OPD based communication system according to some example embodiments.

In FIG. 17, the BHJ-OPD-based communication system may include a laser diode (LD) module and an OPD module.

An analog signal generated by an arbitrary waveform generator (AWG) may be transmitted to the LD module together with a DC (direct current) bias through a bias-T device. The optical power and beam magnitude of the light beam (e.g., green light) of the LD module may be controlled by optical mechanical components such as optics and lens, aperture, and polarizing plate.

In FIG. 17, the OPD may be biased by reverse voltage supplied from a DC function of the waveform generator for an automatic measurement system. The reverse bias can increase the OPD bandwidth and responsiveness.

The converted current signal may be converted into a voltage signal by a transimpedance amplifier (TIA). Then, an oscilloscope (OSC) may capture the voltage signal in the analog region, sample the captured signal, and quantize the sampled signal for analog-to-digital conversion (ADC). Thereafter, the received digital signal may be processed by a computer device.

Figure 18:
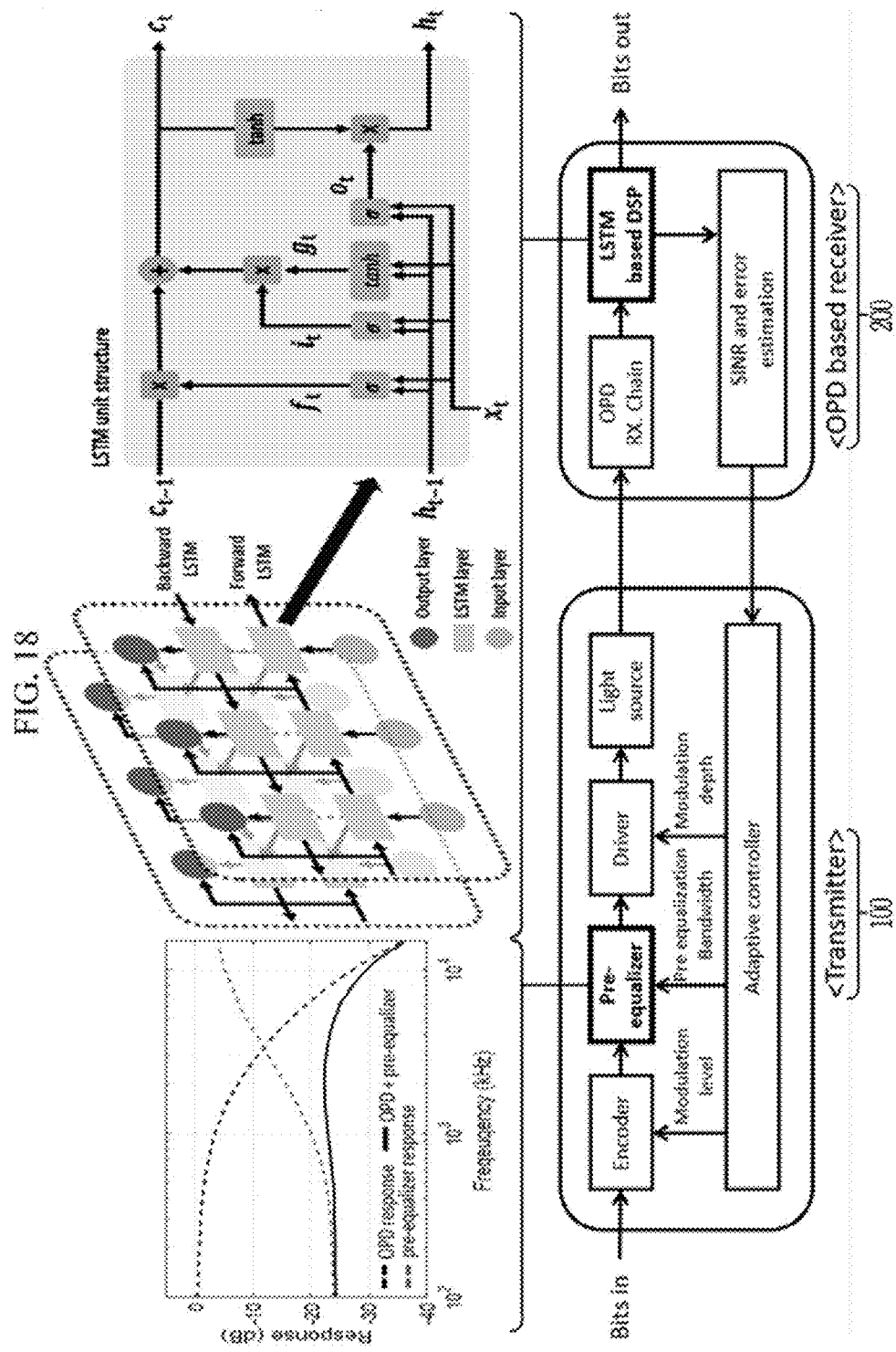
FIG. 18 is a schematic diagram illustrating an optical signal transmission/reception system according to some example embodiments.

FIG. 18 is a schematic diagram illustrating an optical signal transmission/reception system according to some example embodiments.

To improve the inherent low bandwidth of the optical signal transmission/reception system, the pre-equalizer may be used (e.g., in the transmitter 100 as shown, and as described herein). Referring to FIG. 18, system bandwidth can be improved by applying the pre-equalizer (e.g., pre-equalizer 130). When the pre-equalizer is used (e.g., by the transmitter 100), the response of the low-frequency component may be reduced, so a penalty on the signal-to-noise ratio (SNR) may occur. Therefore, the balance between the bandwidth and the power may be carefully considered in the design of the pre-equalizer.

The transmission/reception system according to some example embodiments may use the LSTM network as a digital signal processor for processing sequential data. A single LSTM device (e.g., receiver 200) may include a plurality of information gates. A forget gate may determine a state of a cell as to whether or not to preserve information. An input gate may determine information related to an update. The output may be calculated using the result of the information gate and the calculated output may be transmitted to the next layer. All steps in this process may be affected by previous results. Therefore, the LSTM method may predict the original data by processing ISI in sequential data sets such as communication signals and alleviate a problem.

For example, the bi-LSTMs including a forward direction LSTM and a reverse direction LSTM can learn a communication signal more efficiently.

Figure 19:
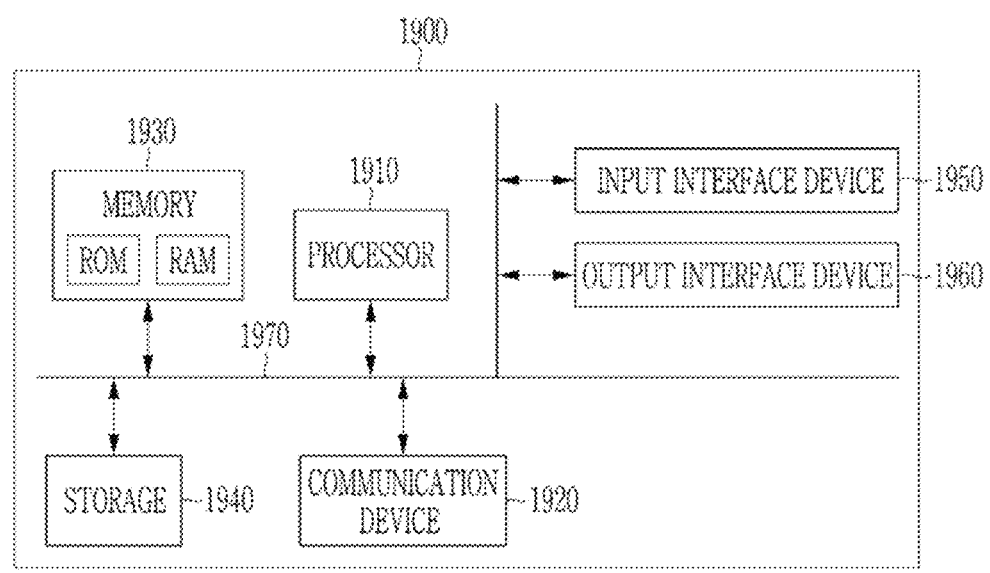
FIG. 19 is a block diagram illustrating an optical communication system according to some example embodiments.

FIG. 19 is a block diagram illustrating an optical communication system according to some example embodiments.

The optical communication system according to some example embodiments may be implemented as a computer system, for example, a computer-readable medium. Referring to FIG. 19, the computer system 1900 may include at least one of a processor 1910, a memory 1930, an input interface device 1950, an output interface device 1960, or a storage device 1940 communicating through a bus 1970. The computer system 1900 may also include a communication device 1920 coupled to the network. The processor 1910 may be a central processing unit (CPU) or a semiconductor device that executes instructions stored in the memory 1930 or the storage device 1940. The memory 1930 and the storage device 1940 may include various forms of volatile or nonvolatile storage media. For example, the memory may include read only memory (ROM) or random-access memory (RAM). In some example embodiments of the present inventive concepts, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, some example embodiments may be implemented as a method implemented in the computer, or as a non-transitory computer-readable medium in which computer executable instructions are stored. In some example embodiments, when executed by a processor, the computer-readable instruction may perform the method according to at least one aspect of the present inventive concepts.

The communication device 1920 may transmit or receive a wired signal or a wireless signal.

Some example embodiments are not implemented only by the apparatuses and/or methods described so far, but may be implemented through a program realizing the function corresponding to the configuration of some example embodiments of the present inventive concepts or a recording medium on which the program is recorded. Such example embodiments can be easily implemented by those skilled in the art from the description of some example embodiments described above. Specifically, methods (e.g., network management methods, data transmission methods, transmission schedule generation methods, etc.) according to some example embodiments of the present inventive concepts may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for some example embodiments of the present inventive concepts or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in some example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in some example embodiments may be implemented by software, and the software may be recorded on a recording medium. The components, the functions, and the processes described in some example embodiments may be implemented by a combination of hardware and software. The method according to some example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

As described herein, any devices, electronic devices, modules, units, circuits, and/or portions thereof according to any of the example embodiments, and/or any portions thereof (including, without limitation, the transmitter 100, the controller 110, the encoder 120, the pre-equalizer 130, the driver 140, the receiver 200, the organic photoelectric conversion device 210, the ML demodulator 220, the decoder 230, the SINR estimator 240, the communication interface 190, the communication interface 290, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., a CPU) configured to execute the program of instructions to implement the functionality and/or methods performed by some or all of any devices, electronic devices, modules, units, circuits, and/or portions thereof, according to any of the example embodiments, including any of the methods according to any of the example embodiments.

Any of the memories described herein may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

The present specification includes details of a number of specific implements, but it should be understood that the details do not limit any inventive concepts or what is claimable in the specification but rather describe features of some example embodiments.

Features described in the specification in the context of individual example embodiments may be implemented as a combination in one or more single example embodiments. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While the inventive concepts have been described in connection with what is presently considered to be practical example embodiments, it is to be understood that the inventive concepts are not limited to such example embodiments. On the contrary, the inventive concepts are intended to cover various modifications and equivalent arrangements included within the spirit and scope of the appended claims.

What is claimed is:

1. A method, comprising:
equalizing signals at a transmitter to reinforce a particular wavelength band associated with a reception characteristic of an organic photoelectric conversion device of a receiver, based on a particular equalization parameter;
modulating the equalized signals at the transmitter;
driving the modulated equalized signals at the transmitter to a light source to be transmitted as an optical signal;
receiving, at the transmitter, a signal to interference and noise ratio (SINR) estimated by the receiver subsequently to the optical signal being transmitted from the light source and being received and demodulated by the receiver; and
adjusting, at the transmitter, the particular equalization parameter based on the received SINR.

2. The method of claim 1, further comprising:
re-equalizing, at the transmitter, a signal corresponding to a next bit to be transmitted to the receiver according to the adjusted particular equalization parameter.

3. The method of claim 2, further comprising:
adjusting, at the transmitter, a modulation level for encoding based on the received SINR and encoding the next bit into a signal based on the adjusted modulation the signal corresponding to the next bit using the adjusted modulation level before the re-equalizing.

4. The method of claim 2, further comprising
adjusting, at the transmitter, a modulation depth for modulation based on the received SINR;
modulating, at the transmitter, the re-equalized signal based on the adjusted modulation depth; and
driving, at the transmitter, the modulated re-equalized signal to the light source.

5. The method of claim 1, further comprising:
converting, at the receiver, the optical signal received from the transmitter into an electrical signal; and
inputting, at the receiver, the electrical signal to a trained artificial neural network to demodulate the electrical signal based on an output of the trained artificial neural network.

6. The method of claim 5, further comprising:
estimating, at the receiver, the SINR based on the output of the trained artificial neural network; and
transmitting the estimated SINR from the receiver to the transmitter.

7. The method of claim 6, wherein:
the converting is performed based on the organic photoelectric conversion device of the receiver converting the optical signal into the electrical signal, and
the method includes determining, at the receiver, a magnitude of a reverse bias to be supplied to the organic photoelectric conversion device based on the estimated SINR.

8. The method of claim 7, wherein the organic photoelectric conversion device includes a plurality of cells, and each cell of the plurality of cells includes a plurality of active layers configured to convert optical signals of a plurality of wavelength bands.

9. The method of claim 8, wherein
the plurality of active layers includes a first active layer and a second active layer, the first active layer different from the second active layer, and
the converting includes the organic photoelectric conversion device converting optical signals based on the optical signals being in a first wavelength band of the plurality of wavelength bands and a second wavelength band of the plurality of wavelength bands, the second wavelength band different from the first wavelength band, such that
the first active layer of the plurality of active layers converts an optical signal of the first wavelength band, and
the second active layer of the plurality of active layers converts an optical signal of the second wavelength band.

10. The method of claim 8, wherein
at least two cells of the plurality of cells include separate pluralities of active layers, the separate pluralities of active layers configured to photoelectrically convert optical signals of different combinations of wavelength bands.

11. A method, comprising:
equalizing signals at a transmitter to reinforce a particular wavelength band associated with a reception characteristic of an organic photoelectric conversion device of a receiver;
modulating the equalized signals at the transmitter;
driving a light source with the modulated equalized signals at the transmitter to provide an optical signal;
transmitting the optical signal to the receiver;
receiving, at the transmitter, a signal to interference and noise ratio (SINR) estimated by the receiver based on the optical signal received from the transmitter;
re-equalizing, at the transmitter, a signal corresponding to a next bit based on the received SINR;

driving the light source with the re-equalized signal at the transmitter to provide a further optical signal; and transmitting the further optical signal to the receiver.

12. The method of claim 11, wherein the re-equalizing comprises adjusting equalization bandwidth.

13. The method of claim 11, further comprising:

adjusting, at the transmitter, a modulation level for encoding based on the received SINR, and encoding the next bit into the signal corresponding to the next bit using the adjusted modulation level before the re-equalizing.

14. The method of claim 11, further comprising:

adjusting, at the transmitter, a modulation depth for modulation based on the received SINR; and modulating, at the transmitter, the re-equalized signal based on the adjusted modulation depth, wherein the modulated re-equalized signal is used as the re-equalized signal driving the light source.

15. The method of claim 11, further comprising:

converting, at the receiver, the optical signal received from the transmitter into an electrical signal; and inputting, at the receiver, the electrical signal to a trained artificial neural network to demodulate the electrical signal based on an output of the trained artificial neural network.

16. The method of claim 15, further comprising:

estimating, at the receiver, the SINR based on the output of the trained artificial neural network; and transmitting the estimated SINR from the receiver to the transmitter.

17. The method of claim 16, wherein the converting is performed based on the organic photoelectric conversion device of the receiver converting the optical signal into the electrical signal, and the method includes determining, at the receiver, a magnitude of a reverse bias to be supplied to the organic photoelectric conversion device based on the estimated SINR.

18. The method of claim 17, wherein the organic photoelectric conversion device includes a plurality of cells, and each cell of the plurality of cells includes a plurality of active layers configured to convert optical signals of a plurality of wavelength bands.

19. The method of claim 18, wherein the plurality of active layers includes a first active layer and a second active layer, the first active layer different from the second active layer, and the converting includes the organic photoelectric conversion device converting optical signals based on the optical signals being in a first wavelength band of the plurality of wavelength bands and a second wavelength band of the plurality of wavelength bands, the second wavelength band different from the first wavelength band, such that the first active layer of the plurality of active layers converts an optical signal of the first wavelength band, and the second active layer of the plurality of active layers converts an optical signal of the second wavelength band.

20. The method of claim 18, wherein at least two cells of the plurality of cells include separate pluralities of active layers, the separate pluralities of active layers configured to photoelectrically convert optical signals of different combinations of wavelength bands.

* * * * *